United States Patent [19]
Toyoguchi

[11] Patent Number: 5,596,561
[45] Date of Patent: Jan. 21, 1997

[54] SHIFTING DEVICE AND LOADING DEVICE FOR DISC-SHAPED RECORDING MEDIUM

[75] Inventor: Tsutomu Toyoguchi, Tokyo, Japan

[73] Assignee: Sony Corportation, Tokyo, Japan

[21] Appl. No.: 377,400

[22] Filed: Jan. 24, 1995

[30] Foreign Application Priority Data

Jan. 27, 1994 [JP] Japan .................................. 6-007595

[51] Int. Cl.⁶ .................................................. G11B 17/04
[52] U.S. Cl. ......................... 369/77.1; 369/75.2; 369/263
[58] Field of Search .................................. 369/75.2, 77.1, 369/77.2, 263; 360/99.02, 99.03, 99.06, 99.07

[56] References Cited

U.S. PATENT DOCUMENTS

| | | | |
|---|---|---|---|
| 4,628,498 | 12/1986 | Takatmatsu et al. | 369/77.1 |
| 4,829,502 | 5/1989 | Aoyagi et al. | 369/77.1 |
| 5,056,077 | 10/1991 | Morikawa et al. | 369/77.1 |
| 5,062,099 | 10/1991 | Odawara et al. | 369/263 |
| 5,084,855 | 1/1992 | Kobayashi et al. | 369/75.2 |
| 5,321,687 | 1/1994 | Kinoshita | 369/75.2 |

FOREIGN PATENT DOCUMENTS 143554 6/1985 European Pat. Off. .
347812 12/1989 European Pat. Off. .

Primary Examiner—Stuart S. Levy
Assistant Examiner—Paul J. Ditmyer
Attorney, Agent, or Firm—Jay H. Maioli

[57] ABSTRACT

A loading device for a disc-shaped recording medium, such as an optical disc, includes a recording/reproducing unit, a loading member, a transport mechanism, a control mechanism and a chuck mechanism. The recording/reproducing unit has a rotating driving mechanism for rotationally driving the disc-shaped recording medium and a head for recording and/or reproducing information signals on or from the disc-shaped recording medium. The loading member is arranged facing the recording/reproducing unit on the chassis for movement along the chassis surface. The transport mechanism transports the disc-shaped recording medium introduced into the apparatus as far as the recording/reproducing unit. The control mechanism releases the disc transport operation by the transport mechanism by the loading member being moved on the chassis. After the transport operation of transporting the disc-shaped recording medium by the transport mechanism is discontinued by the control mechanism, the chuck mechanism chucks the disc-shaped recording medium transported by the movement of the loading member on the chassis in cooperation with the rotating driving mechanism of the recording/reproducing unit.

10 Claims, 27 Drawing Sheets

SHIFTING DEVICE AND LOADING DEVICE FOR DISC-SHAPED RECORDING MEDIUM

BACKGROUND

1. Field of the Invention

This invention relates to a loading device and a shifting device for a disc-shaped recording medium. More particularly, it relates to a loading device for a disc-shaped recording unit having a loading member, and a shifting device for the disc-shaped recording medium.

2. Background of the Invention

There has hitherto been proposed a disc-shaped recording medium, such as an optical disc, a magnetic disc or a magneto-optical disc. Such disc-shaped recording medium is referred to hereinafter as a disc. There has also been proposed a disc recording and/or reproducing apparatus having recording/reproducing means for recording and/or reproducing information signals on or from the disc. Such disc recording and/or reproducing apparatus includes a disc loading device for loading the disc on recording/reproducing means.

The disc loading device described in, for example, JP-B-04 4671, is so arranged and designed that a disc introduced from the front side of the loading device is clamped between a stationary roll and a driving roll kept parallel to each other and is transferred towards the rear side under the driving force of the driving roll.

With such loading device, when the disc transferred by the rolls reaches a region overlying a disc loading portion (disc table) constituting the recording/reproducing unit above a chassis, the disc is first released from a clamped state by the rolls. The disc is then clamped by the disc loading portion and a clamping plate (chuck plate) mounted above the disc loading portion so as to be loaded on the recording/reproducing unit. The clamp plate is rotatably mounted on the foremost part of a clamp member (chuck arm) pivotally mounted at its proximal end.

The operation of shifting the driving roll into and out of contact with the stationary roll and the operation of rotating the clamp plate into and out of contact with the disc loading portion are carried out by shifting loading arms (loading members) mounted laterally of a base member. These loading arms are rotatably supported with respect to a frame and rotated under the driving force exerted by a motor and a plunger driven in dependence upon the disc position.

With the above-described disc loading device, since the loading arms taking charge of the shifting of the driving roll and the rotation of the clamping member are mounted laterally of the base member, it is difficult to reduce the size of the device along the lateral sides. On the other hand, since the loading arms are shifted in a direction along the thickness of a disc recording and/or reproducing apparatus having the disc loading device contained therein, that is, in a direction substantially normal to the major surface of the base member, it is difficult to increase the possible shifting distance of the loading arms. If the shifting distance of the loading arms is small, it is difficult for the driving roll and the clamp member to be shifted over a sufficient distance.

In addition, frequently the base member is supported in a floating manner by means of an elastically deformable vibration-absorbing member. Since the base member can be moved in such a case by the deformation of the vibration-absorbing member, it is necessary for the base member to be held against possible movement when the disc is transferred relative to the base member. It is desirable that the base member be held in this manner in conjunction with the transfer of the disc, that is, with the rotation of the loading arms. However, since the loading arms are mounted laterally of the base member, a link mechanism of a complicated construction needs to be provided for transmitting the rotation of the loading arms to the mechanism holding the base member.

Moreover, with the shifting device constituting the above-described loading device, it is necessary to halt the operation of chucking the disc during transfer of the disc. Apart from the shifting device in the disc loading device, there may be occasions wherein an operation needs to be halted in a stand-by state while another operation proceeds on. Consequently, should the shifting device be designed to be driven by a motor, it is necessary to produce such an operating state in which the chuck operation is halted even when the motor is driven in rotation.

For this reason, it has been customary with the shifting device to halt the transmission of the driving force to a given motion transmitting mechanism by interrupted gear teeth formed in a drive force transmitting follower gear while the driving force is being transmitted to another motion transmitting mechanism.

However, should the transmission of the driving force be halted by the interrupted gear teeth, there is a risk that, if the teeth are not phased correctly to each other at the start of transmission of the driving force, that is, when the driving gear meshes with the first tooth next to the interrupted gear teeth, the gear teeth strike each other to halt the driving gear and the follower gear. While it may be contemplated to lower the height of the first tooth next to the interrupted gear teeth or to design the first gear tooth so as to be elastically deformed for preventing such accident from occurring, problems are raised in connection with operational reliability and durability. Above all, if a larger driving force needs to be transmitted or a larger load needs to be sustained by the follower gear, there is a risk that the teeth would be broken or the follower gear would be unable to mesh with the driving gear.

SUMMARY OF THE INVENTION

It is therefore an object of the present invention to provide a loading device for a disc-shaped recording medium which resolves the above-mentioned problems.

It is another object of the present invention to provide a shifting device which resolves the above-mentioned problems.

In one aspect, the present invention provides a loading device for a disc-shaped recording medium comprising a recording/reproducing unit for recording and/or reproducing information signals on or from the disc-shaped recording medium, a loading member mounted on a chassis for facing the recording/reproducing medium for movement along the surface of the chassis, a transport mechanism for transporting the disc-shaped recording medium, a control mechanism for releasing the disc transport movement by the transport mechanism by the loading member being moved on the chassis, and a loading mechanism for loading the disc-shaped recording medium transported by the loading member being moved on the chassis after releasing by the control mechanism of the transporting operation of the disc-shaped recording medium by the transport mechanism.

In another aspect, the present invention provides a shifting device comprising a driving gear driven in rotation, a first shifting member having a first follower gear meshing with the driving gear and an interrupted gear portion for producing idle running of the driving gear, and a second shifting member having a second follower gear portion meshing with the driving gear. The second shifting member is mounted for movement on the first shifting member. The second shifting member is moved relative to the first shifting member when the driving gear faces the interrupted gear portion and is run in idle rotation so that the second follower gear portion meshes with the driving gear. The second shifting member is shifted along with the first shifting member for engaging the first follower gear portion with the driving gear when the second follower gear portion meshes with the driving gear and is shifted by the driving gear.

In still another aspect, the present invention provides a loading device for a disc-shaped recording medium comprising a recording/reproducing unit for recording and/or reproducing information signals on or from the disc-shaped recording medium, and a transport mechanism for transporting the disc-shaped recording medium introduced therein to the recording/reproducing unit. The transport mechanism has a driving roll arranged on one surface of the disc-shaped recording medium for shifting the disc-shaped recording medium towards the recording/reproducing unit and a clamp member arranged on the opposite surface of the disc-shaped recording medium for clamping the disc-shaped recording medium along with the driving roll. The loading device also comprises a loading mechanism mounted on the recording/reproducing unit for loading the disc-shaped recording medium transported by the transport mechanism on the recording/reproducing unit, and a plurality of elastically deformable elastic members mounted between the chassis and said recording/reproducing unit. The loading device further comprises a holding mechanism inhibiting elastic deformation of the elastic members for holding the recording/reproducing unit in position on the chassis until the disc-shaped recording medium is transported by the transport mechanism as far as the recording/reproducing unit and loaded by the loading mechanism, and a loading member having an interrupted gear portion and a gear portion and arranged facing the recording/reproducing unit on the chassis for movement along the surface of the chassis, and a driving mechanism for furnishing a driving force to the loading member and the transport mechanism. The driving mechanism furnishes a driving force to the transport mechanism when the interrupted gear portion of the loading member faces the driving mechanism which meshes with the gear portion for driving the loading mechanism when the loading member is shifted.

DESCRIPTION OF THE INVENTION

Figure 1:
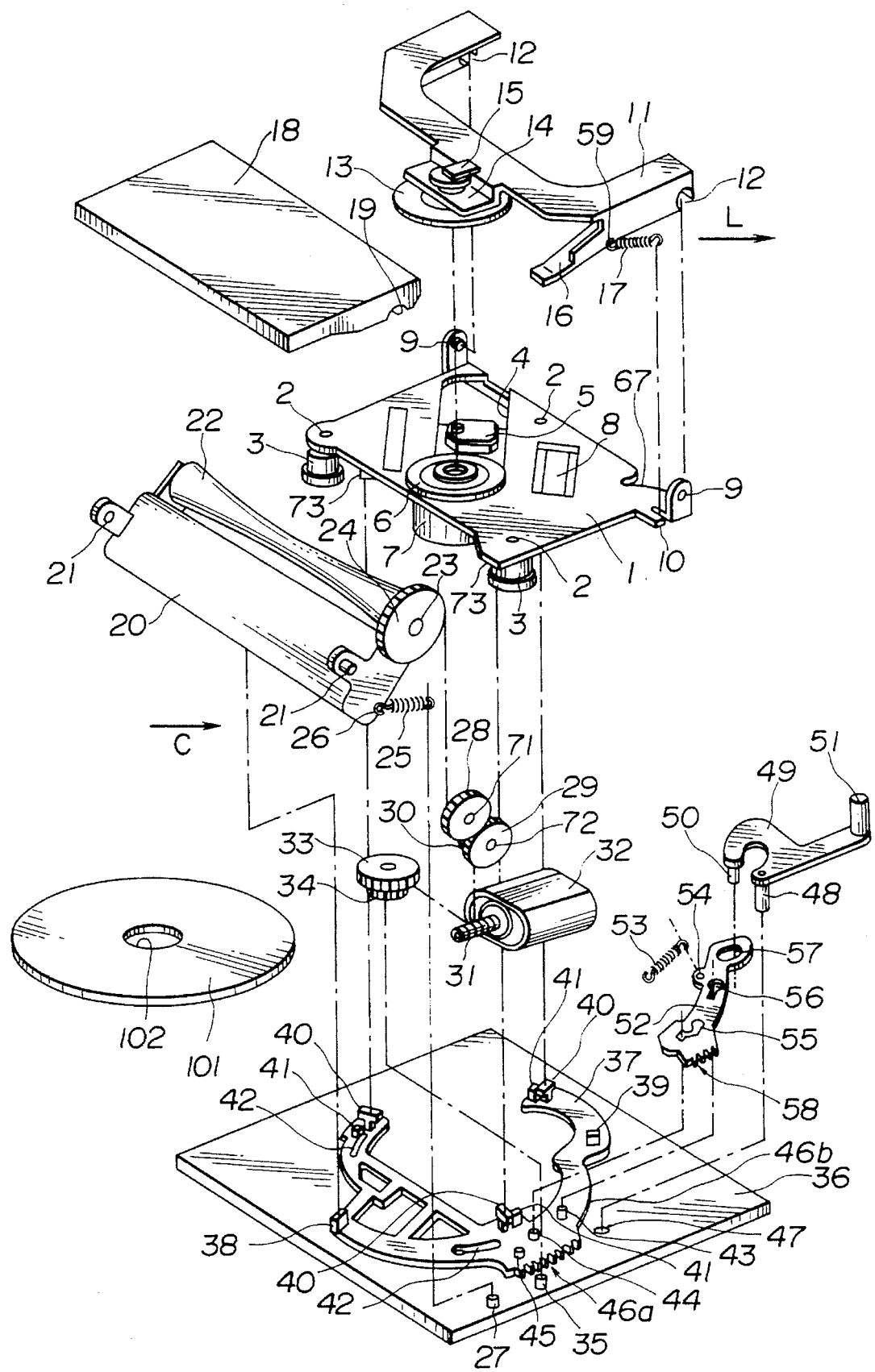
FIG. 1 is an exploded perspective view showing an arrangement of a disc loading device of a disc recording and/or reproducing apparatus according to the present invention.

Referring to the drawings, a preferred embodiment of the present invention will be explained in detail. In the following embodiment, the present invention is applied to a disc loading device of the disc recording/reproducing apparatus adapted for recording/reproducing information signals on or from a disc.

(1) Construction of a Disc

Referring to FIG. 1, a disc 101 for use as a recording medium for information signals in the disc recording and/or reproducing apparatus has a disc-shaped substrate. The disc-shaped substrate has a center chuck hole 102 for positioning and holding the disc 101 in the disc recording and/or reproducing apparatus.

The disc is used as a recording medium for information signals and may be a disc such as an optical disc or a magneto-optical disc. On one of the major surfaces of the substrate is formed a signal recording surface. In the case of the optical disc, the signal recording surface comprises micro-sized irregularities or holes corresponding to the information signals and a reflective layer formed by a thin film of metal, such as aluminum. The signal recording surface in the case of the optical disc may be formed by a dyestuff layer having micro-sized irregularities or holes corresponding to the information signals. In the case of the magneto-optical disc, the signal recording surface has a layer of a magnetic material magnetized in a perpendicular direction corresponding to the information signals.

Recording of information signals on the disc 101 is performed by radiating a light beam condensed by an optical pickup unit as later described on the signal recording surface. In contrast, reproduction of the information signals from the disc 101 is performed by radiating the light beam condensed by the optical pickup unit on the signal recording surface and by detecting the light beam reflected by the signal recording surface.

(2) Construction of Recording and/or Reproducing Unit

Figure 2:
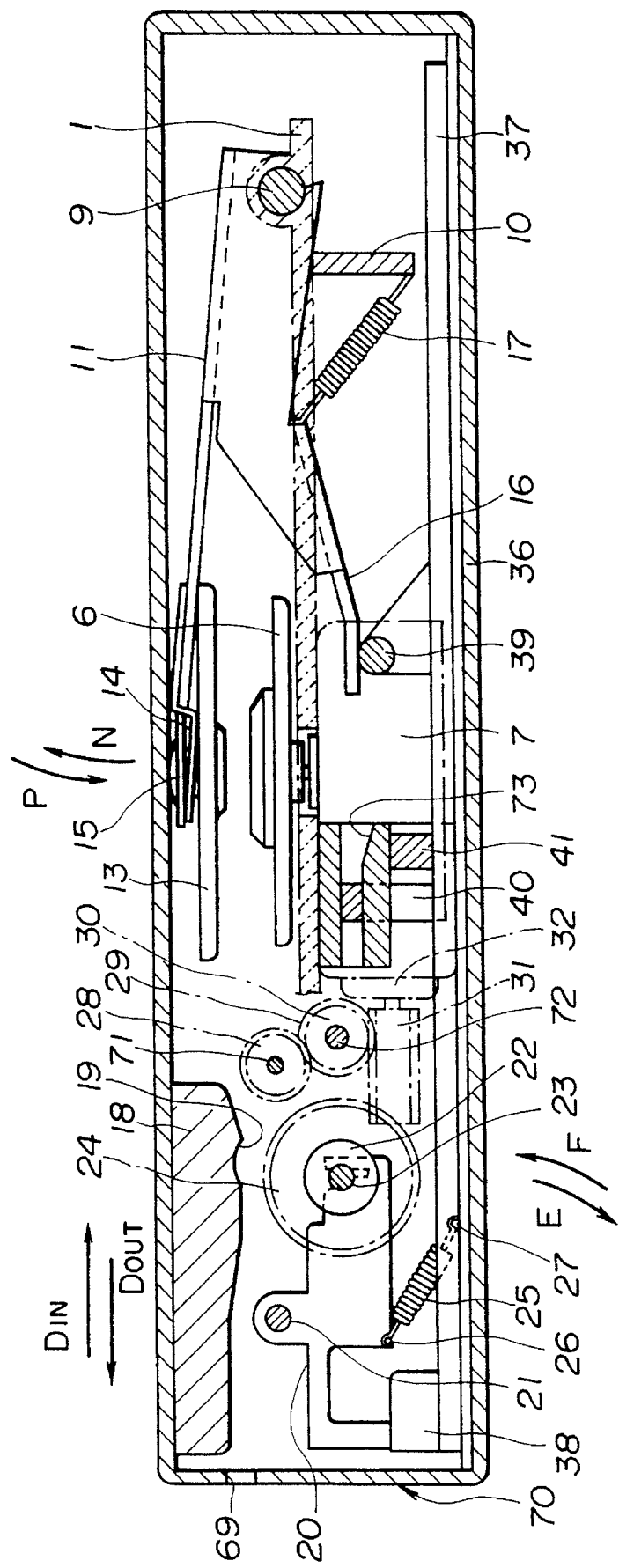
FIG. 2 is a longitudinal sectional view of the disc loading device, looking from a lateral side thereof.

The disc recording and/or reproducing apparatus has a chassis 1, as shown in FIGS. 1 and 2. The chassis 1 is constructed e.g., of metal, and formed as a substantially rectangular flat plate. The chassis 1 is supported for movement relative to a base plate 36 secured to the bottom surface of an outer casing 70 of the disc recording and/or reproducing apparatus via plural elastically deformable dampers 3 acting as vibration absorbing members. This supporting plate is referred to hereinafter as a floating supporting state. That is, damper supporting shafts 2, onto which the dampers 3 are fitted, are dependingly mounted at three positions, that is, at both front corners and at a mid position on the rear edge. The dampers 3 are formed of an elastic material, such as silicon rubber, and are substantially cylindrically-shaped having center holes in which are fitted the damper supporting shafts 2. Each damper 3 has its lower end mounted on the base plate 36. Even when vibrations and impacts are exerted on the base plate 36, these vibrations or impacts are absorbed by the dampers 3 and hence are not transmitted to the chassis 1.

On the chassis 1 is mounted the recording/reproducing unit. The recording/ reproducing unit is designed to record and/or reproduce information signals on or from the disc 101 and includes the optical pickup unit 5 and the disc table 6.

Figure 10:
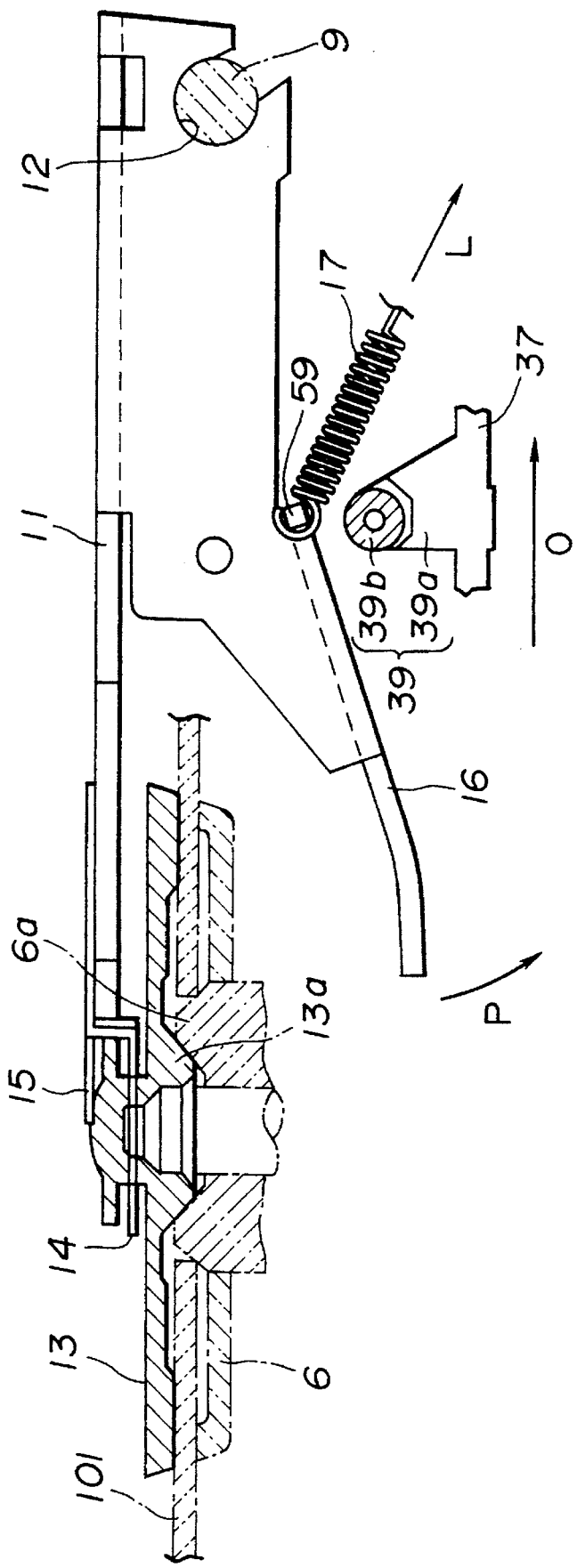
FIG. 10 is a schematic side view showing the state in which the disc has been loaded by the disc loading mechanism.

The disc table 6 is substantially disc-shaped and is mounted on a driving shaft of a spindle motor 7 protruding from the upper surface of the chassis 1. The disc table 6 has a substantially frusto-conically shaped protrusion 6a at a mid position of its upper surface. When the disc 101 is set on the disc table 6, the protrusion 6a is engaged in a chuck hole 102 of the disc 101 for positioning the disc 101, as shown in FIG. 10. The disc table 6 is driven in rotation by the spindle motor 7.

Figure 3:
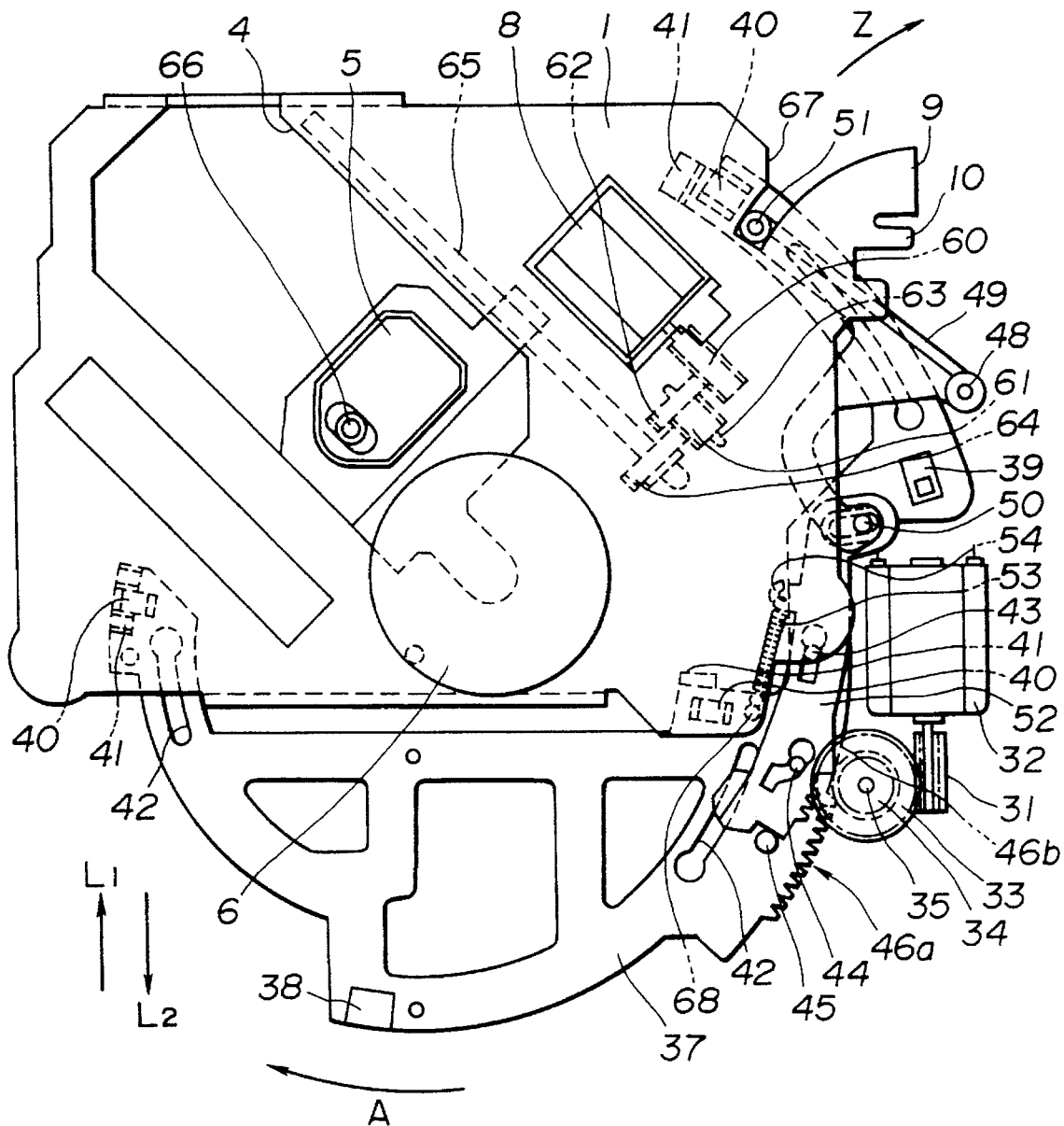
FIG. 3 is a plan view of the disc loading device.

The optical pickup unit 5 has an optical block within which are enclosed a light source, such as a semiconductor laser, an optical system for guiding a light beam radiated from the light source, an objective lens 66 for condensing the light beam on the signal recording surface of the disc 101, and a photodetector, such as a photodiode, for receiving the light beam reflected by the disc 101, as shown in FIG. 3. The optical pickup unit 5 radiates the light beam condensed by the objective lens 66 on the signal recording surface of the optical disc 101 and receives and detects the light beam reflected by the signal recording surface by the photodetector for reproducing information signals from the signal recording surface.

The optical pickup unit 5 is supported by a screw shaft 65 mounted for rotation about its own axis on the chassis 1 and is movable into and out of contact with the disc table 6, that is, along the radius of the disc 101. On the chassis 1 is mounted a feed motor 8, the driving force of which is transmitted to the screw shaft 65 by way of a gear 60 mounted on a driving shaft of the feed motor 8, a first feed gear 62 meshing with the gear 60 and rotatably supported by a supporting shaft 63, a second feed gear 61 integrally formed with the first feed gear 62, and a third feed gear 64 meshing with the second gear 61 and mounted on a screw shaft 65, for rotating the screw shaft 65. The optical pickup unit 5 has a rack portion meshing with a screw groove of the screw shaft 65 and is moved along the axis of the screw shaft 65 with rotation of the screw shaft 65.

The optical pickup unit 5 is arranged with the optical axis of the objective lens 66 extending parallel to a driving shaft of the spindle motor and is supported with the objective lens 66 facing the signal recording surface of the disc 101 set in position on the disc table 6. The optical pickup unit 5 is moved along the screw shaft 65 so that the objective lens 66 will face the signal recording surface of the disc 101 across its inner and outer peripheries.

On the lower surface of the chassis 1 is mounted a plurality of mating lock members 73 making up a chassis lock mechanism as later explained.

(3) Construction of Disc Loading Mechanism

On the chassis 1 is mounted a chuck arm 11 of a disc loading mechanism, as shown in FIGS. 1 and 2. The chuck arm 11 is formed as a substantially U-shaped member having its arm portions rotatably supported by a pair of pivots 9, 9 mounted on both sides of the rear edge of the chassis 1. The end parts of the chuck arm 11 are formed with cut-outs 12, 12 engaged by the supporting shafts 9, 9.

The mid part of the chuck arm 11 is formed with a tongue 14 rotatably supporting a chuck plate 13. The chuck plate 13 is a substantially disc-shaped member having a shank rotatably introduced into a through-hole formed in the tongue 14. The chuck plate 13 has the upper end of the shank thrust by a spring plate 15 having its proximal end supported by the chuck arm 11, so that the chuck plate is biased into movement downward, that is, towards the chassis 1. The chuck plate 13 is arranged above the disc table 6 and is moved by rotation of the chuck arm 11 between a position in contact with the disc table 6 and a position out of contact with the disc table 6 as indicated by arrows P and N in FIG. 2.

The chuck arm 11 is biased into rotation in a direction of thrusting the chuck plate 13 into contact with the disc table 6 by a tension coil spring 17 mounted between the mid part of the chuck arm 11 and a spring retainer 10 provided on the chassis 1, as indicated by arrow L in FIG. 1. The chuck plate 13 clamps the disc 101 set in position on the disc table 6 in cooperation with the disc table 6. At a mid portion of the lower surface of the chuck plate 13 is formed a boss 13a adapted to be engaged in a mating recess in the upper end of the protrusion 6a of the disc table 6.

Figure 9:
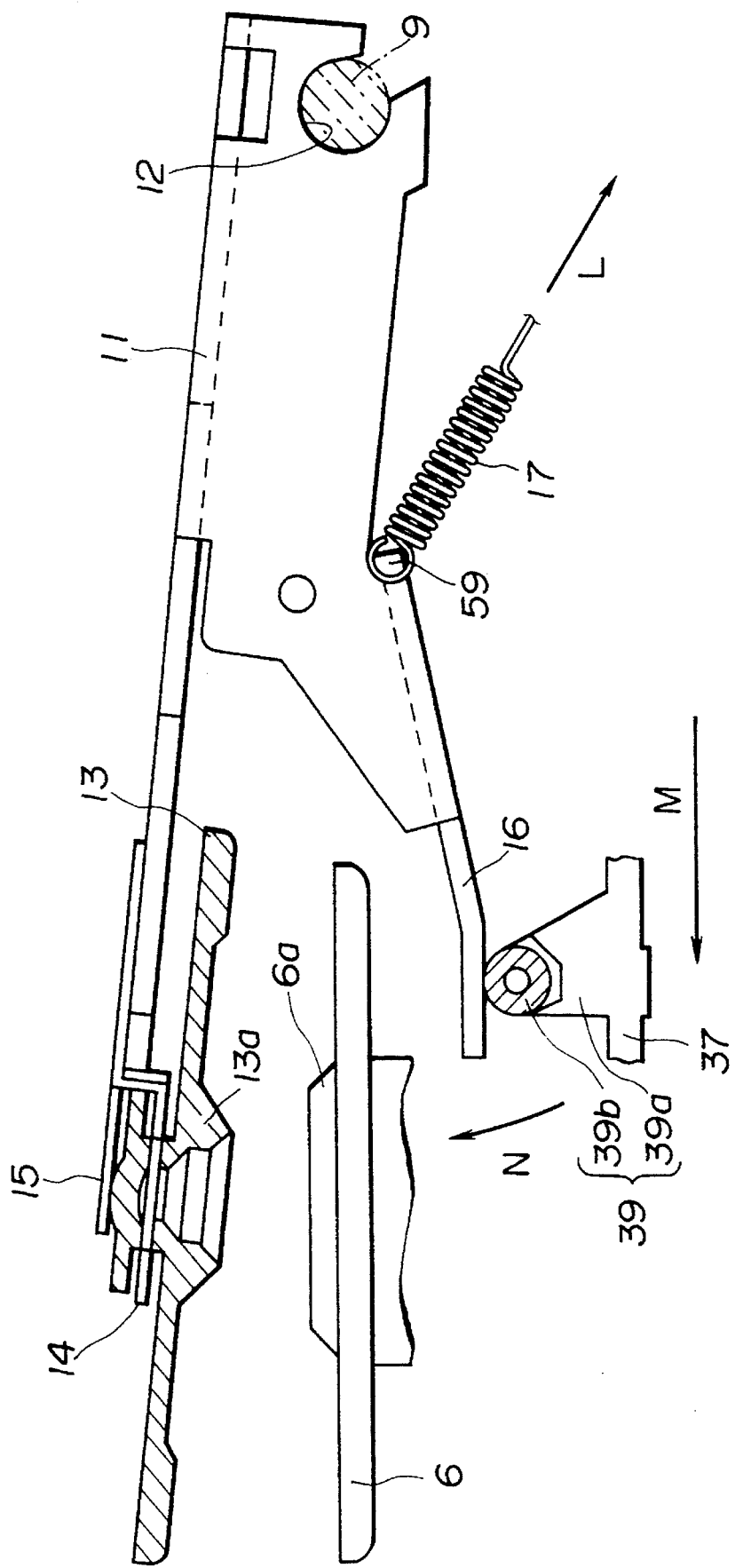
FIG. 9 is a schematic side view showing the structure of a disc loading mechanism of the disc loading device.

The chuck arm 11 has a mating operating member 16 protruded obliquely downward from its mid portion. The mating operating member 16 is extended towards the lower side of the chassis 1 for facing a base plate 36. The mating operating member 16 is moved vertically by an operating boss 39 for the chuck arm of the loading ring 37 which is mounted on the base plate 36 as will be explained subsequently. Vertical movement of the mating operating member 16 causes rotation of the chuck arm 11. The operating boss 39 is made up of an upstanding piece 39a formed at a portion of the loading ring 37 and a rotor 39b mounted at the distal end of the upstanding piece 39a, as shown in FIG. 9.

(4) Construction of Loading Member

Figure 4:
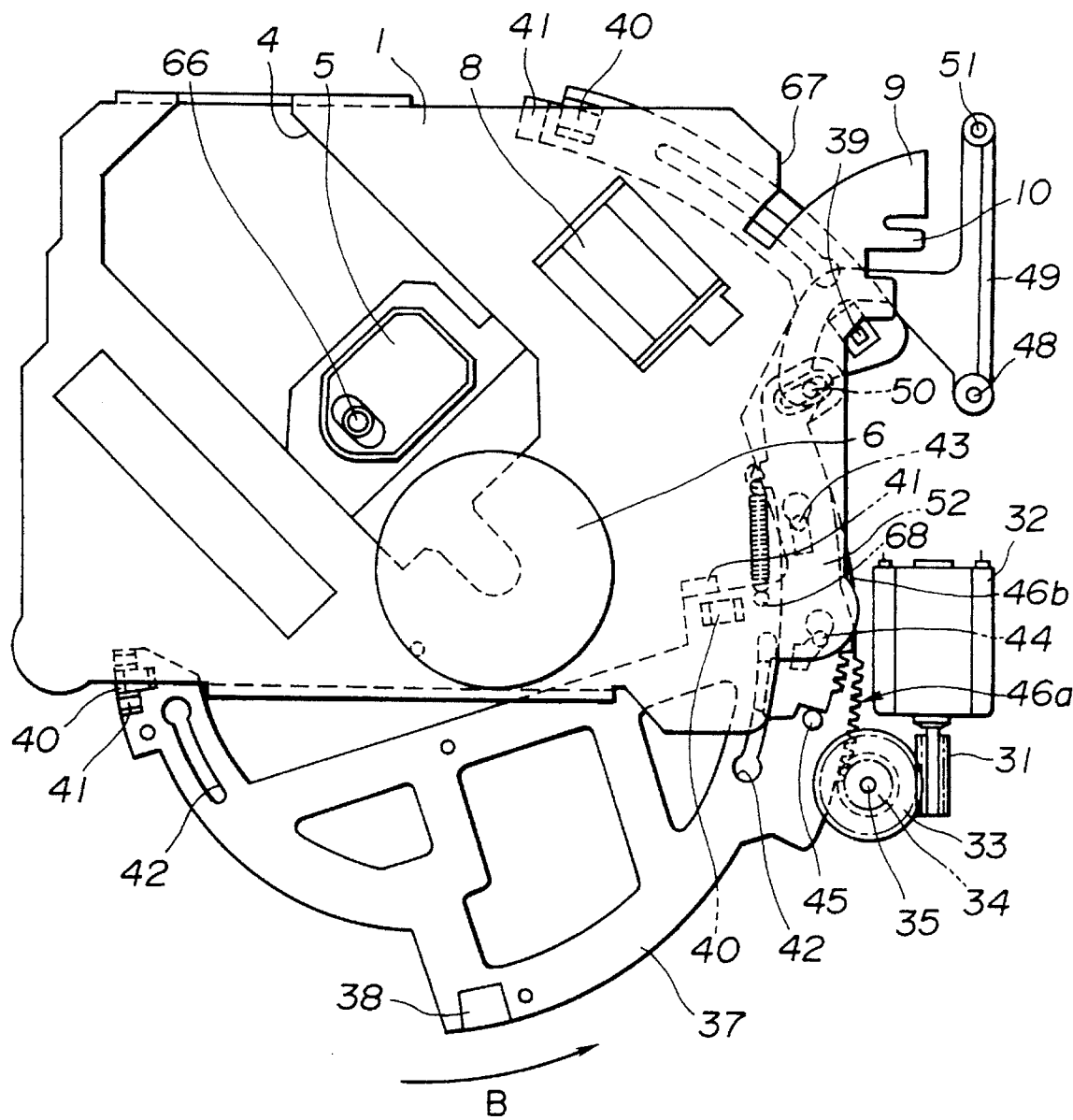
FIG. 4 is a plan view showing the state of completion of disc loading by the disc loading device.

The loading ring 37 as a loading member is mounted on the base plate 36. The loading ring 37 is formed as a substantially semicircular ring and has plural supporting slits 42, 42 extending along the arc of the ring shape, as shown in FIGS. 3 and 4. The loading ring 37 is supported for rotation along the arc of the ring shape of the loading ring 37 by introducing and engaging a plurality of guide pins 77 formed on the base plate 36 in the supporting slits 42, 42. That is, the loading ring 37 is mounted facing the lower major surface of the chassis 1 for movement along the major surface of the chassis 1.

Figure 14:
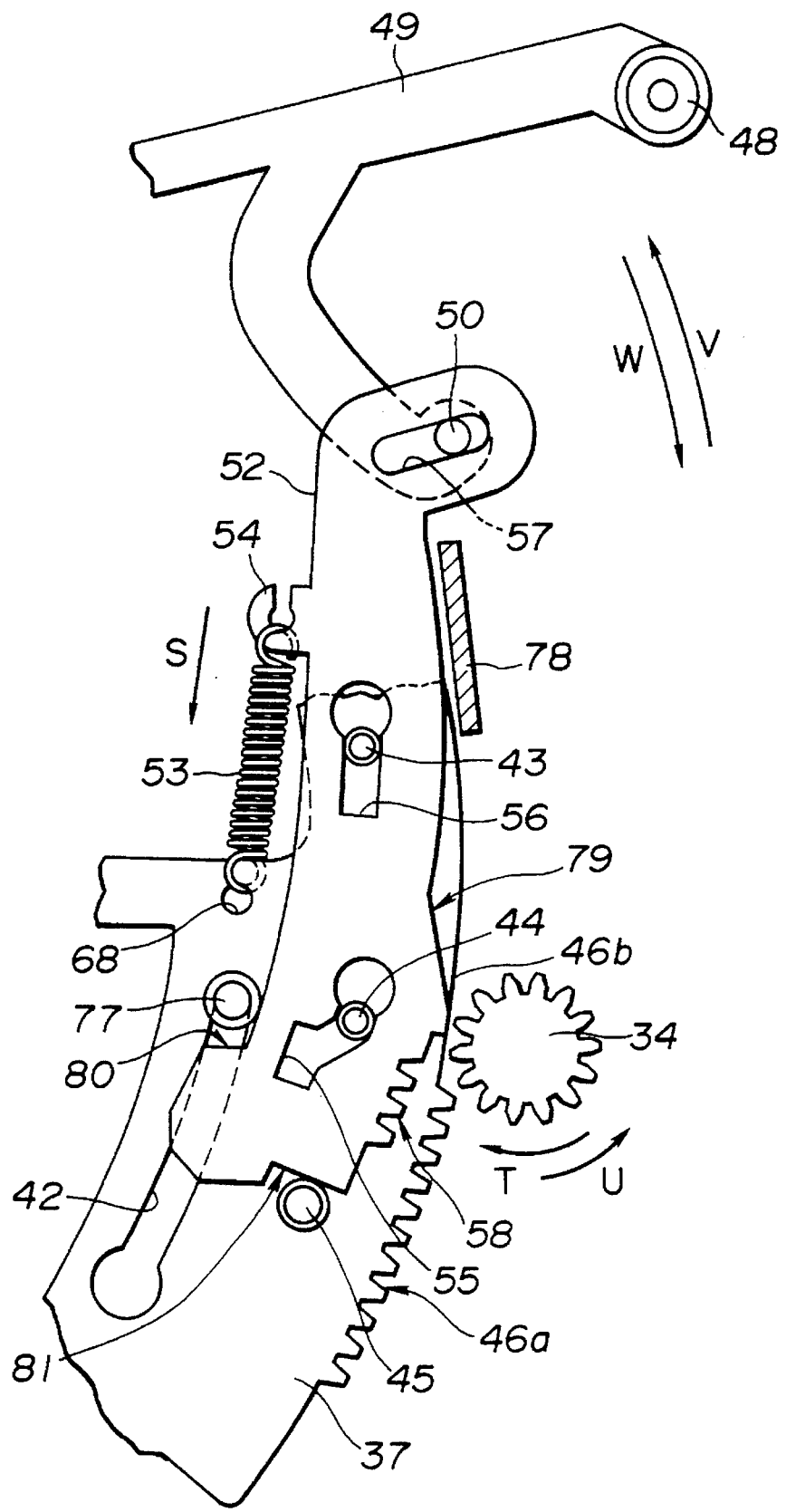
FIG. 14 is an enlarged schematic plan view showing the structure of a loading ring of the disc loading mechanism and a sub-rack plate in the initial state.

The loading ring 37 is rotated by a loading motor 32 mounted on the base plate 36. That is, a worm gear 31 is mounted on a driving shaft of the loading motor 32. The worm gear 31 is engaged by a first worm wheel 33 rotatably mounted via a supporting shaft 35 on the base plate 36. On the first worm wheel 33 is coaxially integrally formed a pinion gear 34 as a driving gear. The pinion gear 34 meshes with a main rack gear 46a, as a first follower gear, formed along a pre-set range on the outer periphery of the loading ring 37. That is, when the pinion gear 34 meshes with the main rack portion 46a, the loading ring 37 is driven in rotation under the driving force of the loading motor 32. The loading ring 37 is formed with an interrupted tooth portion 46b at the back of the loading ring 37 in continuation to the main rack portion 46a, as shown in FIGS. 1 and 14.

In an initial state, that is, before the loading operation for the disc 101 is started, the loading ring 37 is at a rotational angular position such that the main rack portion 46a is not engaged with the pinion gear 34, as shown in FIG. 3. At this time, the pinion gear 34 faces the interrupted tooth 46b at the back of the main rack portion 46a, as shown in FIG. 14. During the loading operation for loading the disc 101, the loading ring 37 has the main rack portion 46a engaged with the pinion gear 34 and thus is rotated. On completion of the loading, the loading ring is rotated from the initial state over an angle corresponding to the angular extent substantially corresponding to the range of the main rack portion 46a, as shown in FIG. 4.

On the loading ring 37 is mounted a sub-rack plate 52 overlying a portion of the main rack portion 46a. The sub-rack plate 52 is substantially arcuate in shape, that is, it is coextensive with a portion of the ring shape of the loading ring 37. The sub-rack plate 52 has a forward supporting slit 55 and a rear supporting slit 56. The sub-rack plate 52 is supported for movement with respect to the loading ring 37 by having the supporting slits 55, 56 passed through by a pair of supporting pins 43, 44 set on the loading ring 37.

Figure 18:
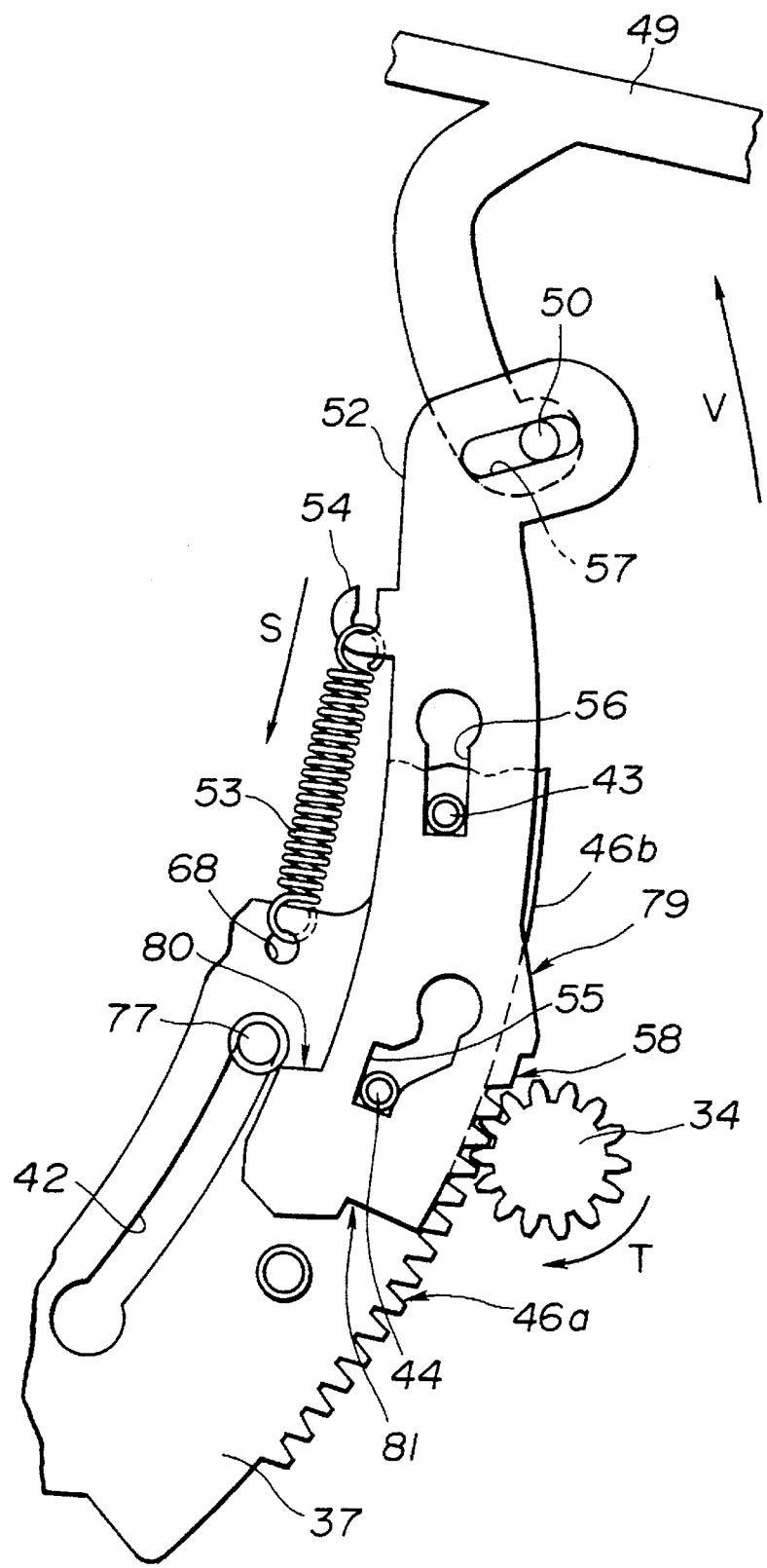
FIG. 18 is an enlarged schematic plan view showing the state in which the sub-rack plate has meshed with the pinion gear during loading.

The rear supporting slit 56 is formed for extending along the length of the sub-rack plate 52 in order to permit the sub-rack plate 52 to be moved back and forth along the arc of a circle of the loading ring 37. The forward supporting slit 55 is formed for extending along the length of the sub-rack plate 52 and has a bowed forward portion which is directed towards the center of the loading ring 37. The forward supporting slit 55 permits the sub-rack plate 52 to be moved back and forth along the arc of a circle of the loading ring 37. When the sub-rack plate 52 is moved forwards and backwards, the forward supporting slit 55 permits the forward end of the sub-rack plate 52 to be moved towards the center of the loading ring 37, as shown in FIG. 14, and towards the outer periphery of the loading ring 37, as shown in FIG. 18.

The sub-rack plate 52 is biased forward by a tension coil spring 53 mounted between a spring retainer 54 mounted upright on the rear portion and a spring retainer opening 68 formed in the loading ring 37, as indicated by arrow S in FIG. 14. In a forward lateral side portion of the sub-rack plate 52 associated with the outer periphery of the loading ring 37 is formed a sub-rack portion 58 functioning as a second follower gear. The sub-rack portion 58 is formed to have the same pitch and tooth shape as those of the main rack portion 46a. When the sub-rack plate 58 is moved rearward, the sub-rack portion 58 is in-phase with the main rack portion 46a and lies on a rearward extension of the main rack portion 46a so as to be engaged with the pinion gear 34, as shown in FIG. 18. The sub-rack portion 58 being in-phase with the main rack portion 46a means that the teeth of the main rack portion 46a are overlapped with the teeth of the sub-rack portion 58 without being shifted relative to each other.

The sub-rack plate 52 has a sloped portion 79 directly at the back of the sub-rack portion 58 and a shoulder 80 at a lateral side of the sub-rack portion 58 opposite to the sloped portion, that is, at a forward end of the sub-rack plate 52 directed towards the center of the loading ring 97. The sloped portion 79 is tapered in a direction in which the sub-rack plate 52 is increased in width towards its front side, that is, towards the sub-rack portion 58. The shoulder 80 is positioned in the vicinity of a guide pin 77, depending on the position in the fore-and-aft direction of the sub-rack plate 52 for determining the position of the forward portion of the sub-rack plate 52 in the radial direction of the loading ring 37. In the initial state, the shoulder 80 is positioned ahead of the guide pin 77. The sloped portion 79 is positioned in the vicinity of a guide rib 78 formed upright on the base plate 96. The sloped portion 79 is abutted against the guide rib 78, depending on the position in the fore-and-aft direction of the sub-rack plate 52, for determining the position of the foremost part of the sub-rack portion 52 along the radius of the loading ring 37. In the initial state, the sloped portion 79 is positioned more forwardly than the guide rib 78.

On the loading ring 37, an abutment pin 45 is set at a position in register with the foremost part 81 of the sub-rack plate 52. The abutment pin 45 is abutted against the foremost part 81 for determining the range of movement of the sub-rack plate 52 in the forward direction. In the initial state, the foremost part 81 of the sub-rack plate 52 is abutted against the abutment pin 45 under the bias of a tension coil spring 53, as shown in FIG. 14.

The rear end of the sub-rack plate 52 is formed with an engagement slit 57. The engagement slit 57 is passed through by an engagement pin 50 of a disc detection lever 49. The disc detection lever 49 is supported for rotation by the rear portion of the base plate 36 via a pivot 48 and has the engagement pin 50 and an upstanding disc detection pin 51. The disc detection pin 51 is protruded above the chassis 1 via a cut-out 67 formed in the rear edge of the chassis 1.

In the initial state, the disc detection lever 49 is rotated in a direction in which the disc detection pin 51 is disposed at the forward side, in such a manner as to follow the sub-rack plate 52 rotated in the forward direction under the bias of the tension coil spring 53, as shown in FIG. 3. When the disc 101 is transported onto the recording/reproducing unit by a disc transporting mechanism as later explained, the disc detection lever 49 has the disc 101 thrust by the detecting pin 51 so as to be thereby rotated in a direction in which the disc detection pin 51 is disposed at the rear side. The sub-rack plate 52 is moved towards rear with respect to the loading ring 37, as shown by arrow V in FIG. 18. When the disc 101 is transported onto the recording/reproducing unit, the sub-rack portion 58 is engaged with the pinion gear 34.

On completion of loading of the disc 101, the sub-rack plate 52 is moved towards rear with rotation of the loading ring 37, so that the disc detection lever 49 is rotated in a direction in which the disc detection pin 51 is at a rear position spaced apart from the disc 101, as shown in FIG. 4.

On the upper surface of the loading ring 37 is set upright a chuck arm actuating boss 39 which is provided at a position in register with the mating operating member 16 and which raises the mating operating portion as shown in FIGS. 2 and 9. The chuck plate 13 is spaced apart at this time from the disc table 6. When the loading ring 37 is rotated with the disc loading operation, the chuck arm actuating boss 39 is moved in a direction away from the mating operating member 16 so as to be spaced apart from the mating operating member 16, as indicated by arrow O in FIG. 10. The mating operating member 16 is moved downwards at this time as shown by arrow P in FIG. 10 so that the chuck plate 13 is moved towards the disc table 6.

On the upper surface of the loading ring 37 are formed a disc transport control projection 38 constituting a disc transport control unit and a plurality of lock hook pawls 40 and plural lock projections 41 making up a chassis lock unit as later explained.

(5) Construction of Disc Transporting Unit

The disc recording and/or reproducing apparatus has a disc transporting mechanism, as shown in FIGS. 1, 2, 5 and 6. The disc transporting mechanism is arranged ahead of the chassis 1. The disc transporting mechanism has a disc sliding contact plate 18 mounted on the lower surface of a top plate on the forward side of the chassis 1 and a disc transporting roll 22. The disc transporting roll 22 is substantially columnar-shaped with gradually increasing diameters on its two ends and is arranged with its axis extending along the front edge of the chassis 1.

The disc transporting roll 22 may be brought into and out of contact with the disc sliding contact plate 18, and is supported for rotation about its own axis. That is, the disc transporting roll 22 is rotatably mounted on the rear portion of a disc transport control cam member 20 via a supporting shaft 23 protruding from its two ends. The disc transport control cam member 20 has a pair of supporting shafts 21, 21 at its two lateral sides and is rotatably mounted on an outer casing 70 via these supporting shafts 21, 21. By rotation of the disc transport control cam member 20, the disc transport roll 22 is brought into and out of contact with the disc sliding contact plate 18. The lower surface of the disc sliding contact plate 18 has a groove 19 in register with the disc transport roll 22, as shown in FIGS. 5 and 6.

Figure 5:
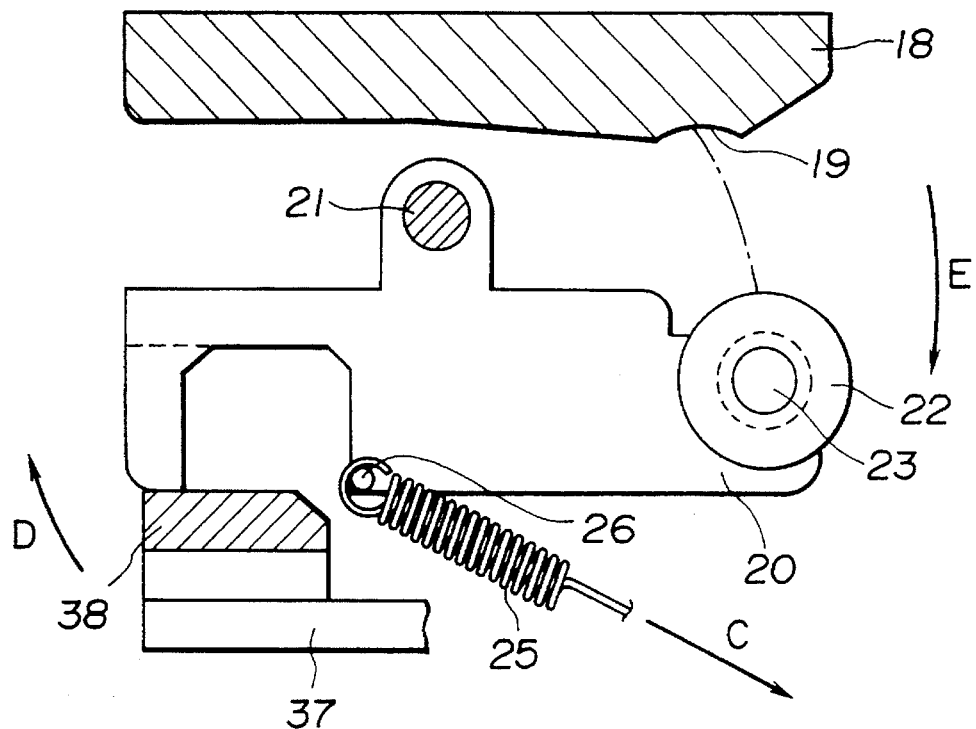
FIG. 5 is an enlarged schematic side view showing an arrangement of a disc transfer mechanism.
Figure 6:
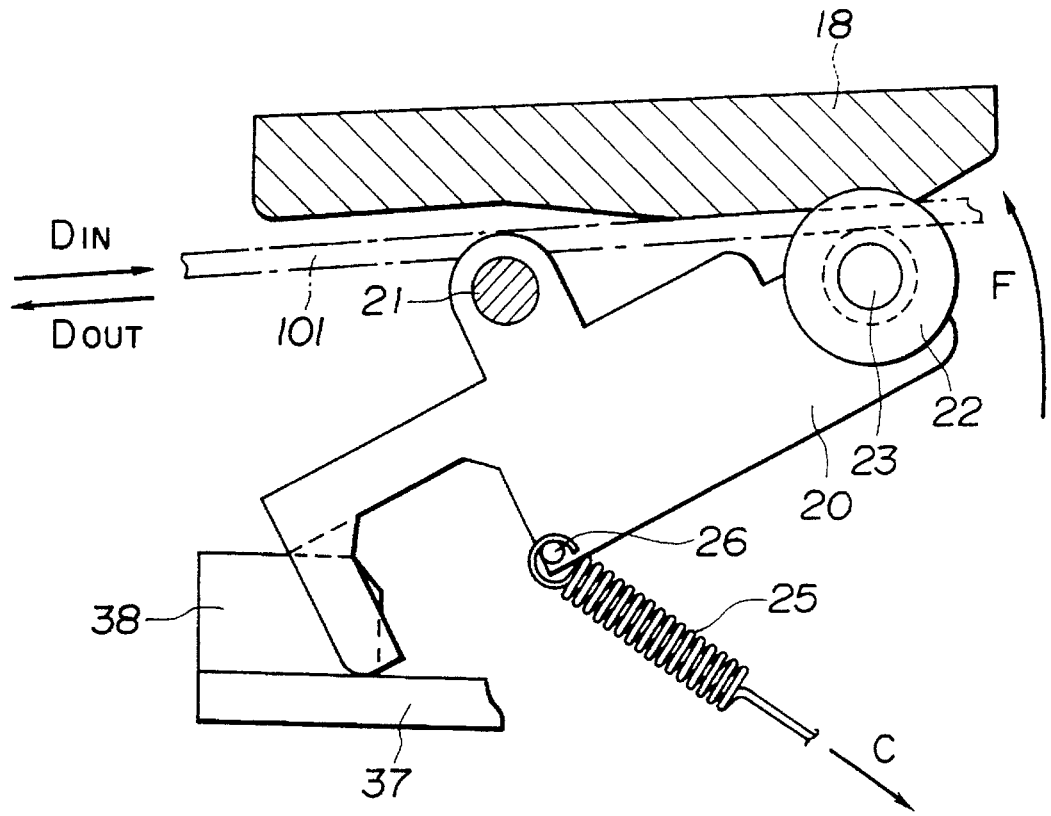
FIG. 6 is an enlarged schematic side view showing the state of disc transfer by the disc transfer mechanism.

The disc transport control cam member 20 is biased into rotation in a direction of thrusting the disc transport roll 22 into contact with the disc sliding contact plate 18, by a tension coil spring 25 mounted between a spring retainer 26 mounted on the cam member 20 and a spring retainer 27 formed on the base plate 36, as shown in FIGS. 1, 5 and 6. The forward edge of the cam member 20 is positioned on the loading ring 37. The forward edge of the cam member 20 is moved vertically by the disc transport control projection 38.

The disc transport roll 22 is rotated by the loading motor 32. That is, the driving shaft of the loading motor has a worm gear 31 meshing with a second worm wheel 30 rotatably mounted on the outer casing 70 via a supporting shaft 72. The second worm wheel 30 is formed integrally and coaxially with a first disc transport transmission gear 29 engaged with a second disc transport transmission gear 28 rotatably mounted on the outer casing 70 via a supporting shaft 71. The second disc transport transmission gear 28 is engaged with a third transport gear 24 mounted on a shaft 23 of the disc transport roll 22.

The third disc transfer transmission gear 24 is engaged with the second disc transport transmission gear 28 when the disc transport roll 22 approaches the disc sliding contact plate 18. Moreover, when the disc transport roll 22 is spaced apart from the disc sliding contact plate 18, the third disc transport transmission gear 24 is disengaged from the second disc transport transmission gear 28. The third disc transport transmission gear 24 is engaged with the second disc transport transmission gear 28 in the initial state and, when the loading motor 32 is driven in rotation, the third disc transport transmission gear 24 transmits the driving force of the loading motor 32 for rotating the disc transport roll 22.

The disc transport mechanism clamps the disc 101 between the disc sliding contact plate 18 and the disc transport roll 22 and transports the disc 101 by rotation of the transport roll 22. That is, the disc 101 has the vicinity of the outer rim thereof pressure-contacted by the outer rim of the disc transport roll 22 and is transported so as to follow the rotation of the disc transport roll 22. The disc 101 is moved in sliding contact with the disc sliding contact plate 18. The disc transport mechanism transports the disc 101, introduced from outside via a disc introducing slit 69 formed in the forward surface of the outer casing 70, to a position overlying the recording/reproducing unit, as shown by arrow $D_{IN}$, while transporting the disc 101 loaded on the recording/reproducing unit to outside via the disc introducing slit 69, as shown by arrow $D_{OUT}$.

(6) Construction of Disc Transport Control Mechanism

The disc recording and/or reproducing apparatus has a disc transport control mechanism for terminating the disc transport operation on completion of transport of the disc 10 by the disc transport mechanism. The disc transport control mechanism also takes charge of the starting of the transport of the disc loaded on the recording/reproducing unit to outside.

Figure 7:
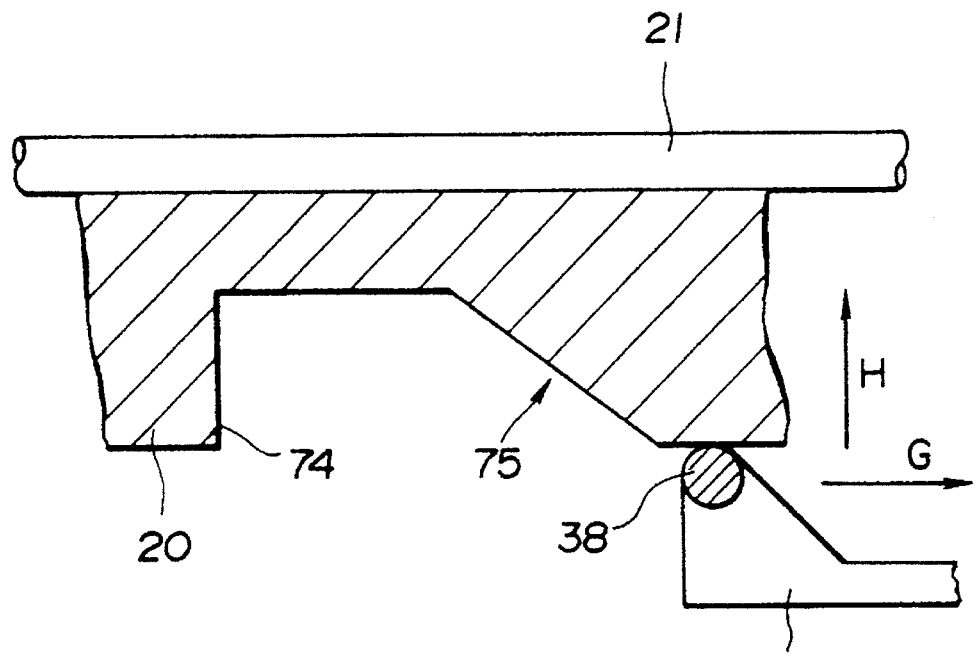
FIG. 7 is an enlarged schematic front view showing an arrangement of a disc transfer control mechanism controlling the disc transfer mechanism.
Figure 8:
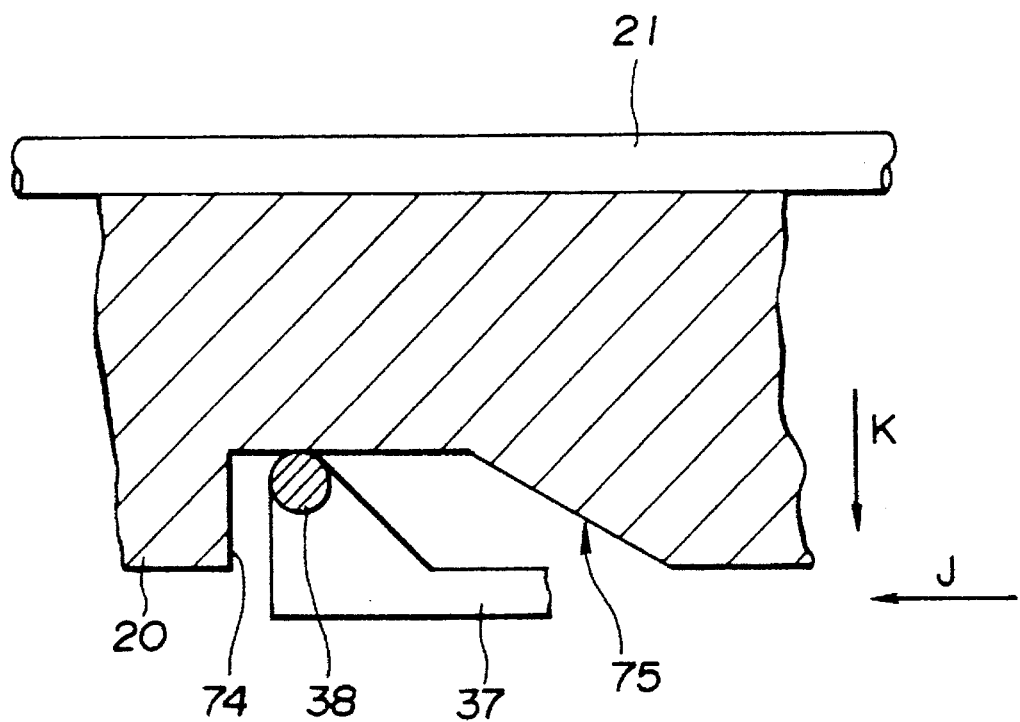
FIG. 8 is an enlarged schematic front view showing the state in which the disc is controlled to be transferred by the disc transfer control mechanism.

The disc transport control mechanism is made up of the disc transport control cam member 20 and the disc transport control projection 38 set upright on the loading ring 37. That is, the forward edge of the disc transport control cam member 20 has a cam recess 74, as shown in FIGS. 7 and 8. In the initial state, the disc transport control projection 38 is fitted into the cam recess 74 without raising the forward edge of the disc transport control cam member 20. Consequently, the disc transport roll 22 is abutted at this time against the disc sliding contact plate 18, as shown in FIG. 6.

If, during the disc loading operation, the loading ring 37 is rotated, the disc transport control projection 38 is shifted and extricated out of the cam recess 74 while having sliding contact with an inclined portion 75 on one lateral side of the cam recess 74, as shown by arrow G in FIG. 7. That is, the disc transport control projection 38 raises the forward edge of the disc transport control cam member 20 for displacing the disc transport roll 22 out of contact with the disc sliding contact plate 18, as shown by arrow E in FIG. 5.

If, during the unloading of the disc 101, the unloading ring 37 is rotated, the disc transport control projection 38 is shifted into engagement with the cam recess 74 while having sliding contact with the inclined portion 75 as indicated by arrow J in FIG. 8. Since the forward edge of the disc transport cam member 20 ceases to be raised by the disc transport control projection 38, the disc transport roll 22 is abutted against the disc sliding contact plate 18, as shown by arrow F in FIG. 6.

(7) Construction of Chassis Lock Mechanism

Figure 13:
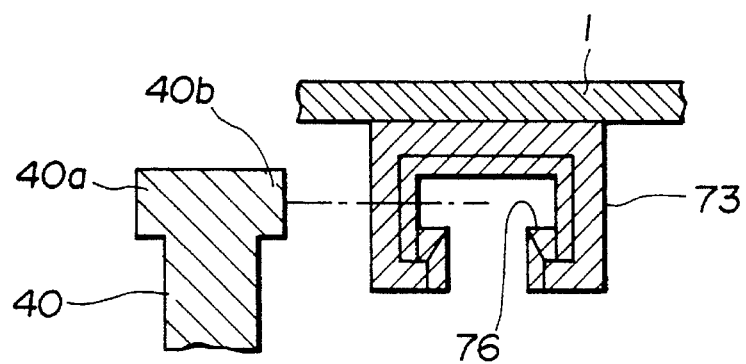
FIG. 13 is an enlarged longitudinal sectional view, looking from the front side, and showing the state in which locking by the chassis lock mechanism has been released.

The chassis lock mechanism is made up of three lock hook pawls 40 and three lock projections 41 provided on the loading ring 37, and three mating lock members 73 provided on the chassis 1. Each lock hook pawl 40 is substantially a projection having end hooks 40a, 40b protruding from both sides, as shown in FIG. 13. These hooks 40a, 40b protrud towards the center and the outer periphery of the loading ring 37. Each lock projection 41 is a rod-shaped projection lower in height than the lock hook pawl 40. Each mating lock member 73 is arranged on the lower surface of the chassis 1 in register with each lock hook pawl 40 and each mating lock projection 41 and, as shown in FIG. 13, has a lock groove 76 into which the hook 40a, 40b of the lock hook pawl 40 are introduced and engaged from the lateral sides. The lock groove 76 is opened in the circumferential direction of the loading ring 37. The lock groove 76 has its sides tapered to permit facilitated insertion of the hooks 40a, 40b of the lock hook pawl 40.

Figure 11:
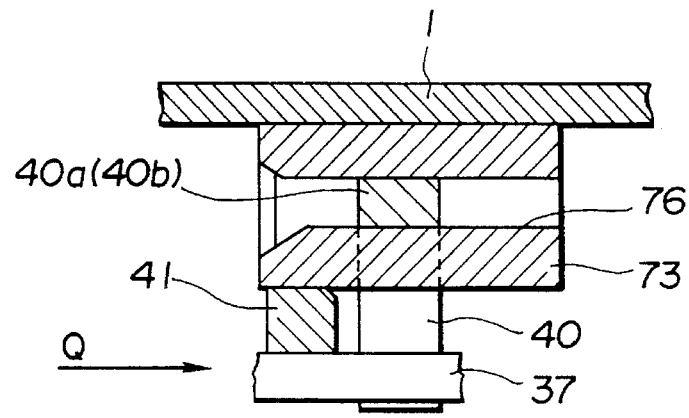
FIG. 11 is an enlarged schematic longitudinal sectional view, looking from the lateral side, and showing the construction of a chassis lock mechanism of the disc loading device.

In the initial state, the mating lock pawl 40 has its end engaged in the lock groove 76 of the mating lock member 73, as shown in FIG. 11. Each lock projection 41 has its distal end abutted against and engaged in the lower surface of the associated mating lock member 73. The chassis 1 is prevented at this time from being shifted relative to the loading ring 37, that is, the base plate 36, and is positioned with respect to the base plate 36.

In the initial state, each lock hook pawl 40 has its terminal end engaged in the lock groove 76 of the associated mating lock member 73, as shown in FIG. 11. Each lock projection 41 at this time has its foremost part abutted against and engaged with the lower surface of the associated mating lock member 73.

Figure 12:
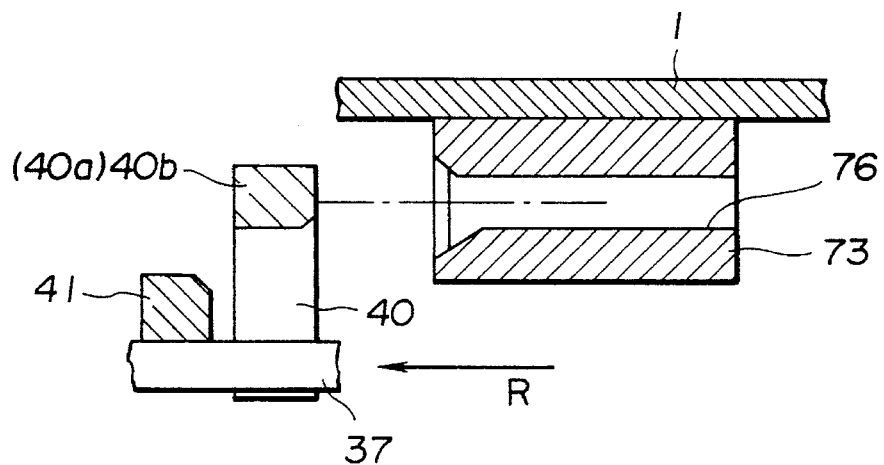
FIG. 12 is an enlarged longitudinal sectional view, looking from the lateral side, and showing the state in which locking by the chassis lock mechanism has been released.

If, during disc loading, the loading ring 37 is rotated, the end hooks 40a, 40b of each lock hook pawl 40 are extricated from within the lock groove 76 of the associated mating lock member 73, as shown by arrow R in FIG. 12 and in FIG. 13. At this time, the end part of each lock projection 41 is displaced away from the lower surface of the associated mating lock member 73. The chassis 1 is now enabled to be shifted with respect to the base plate 36 by deformation of each damper 3.

(8) Operation of Disc Loading Device (8-1) Initial State

With the above-described disc recording and/or reproducing apparatus, the loading ring 37 is at a rotational angular position in which the interrupted tooth portion 46b contiguous to the main rack portion 46a faces the pinion gear 34. The loading motor 32 is at a standstill. The sub-rack plate 52 is located ahead of the loading ring 37 for receding the sub-rack portion 58 towards the center of the loading ring 34. The disc 101 is not set on the disc table 6. The chuck plate 13 of the chuck arm 11 is spaced apart from the disc table 6. The disc transport roll 22 is abutted against the disc slide contact plate 18.

(8-2) Disc Insertion

When the disc 101 is inserted via the disc introducing slit 89, and reaches the vicinity of the disc transport roll 22, the disc 101 is detected by a sensor, such as a photosensor, not shown. The disc recording and/or reproducing apparatus has a control circuit responsive to the detection by the sensor to control the driving of the loading motor 32. On detection of the disc 101 by the sensor, the loading motor 32 is driven in rotation under control by the control circuit in a direction in which the disc 101 is transported by the disc transport roll 22 towards the disc table 6. Since the main rack portion 46a is not engaged with the pinion gear 34, the loading ring 37 is not rotated and halted in the initial state.

(8-3) Disc Transport

The disc 101 is transported in a direction shown by arrow $L_1$ in FIG. 3, by rotation of the disc transport roll 22, while the disc is clamped between the disc transport roll 22 and the disc sliding contact plate 18. The disc 101, transported as far as the chassis 1, thrusts the disc detection pin 51 to rotate the disc detection lever 49 in a direction of displacing the sub-lock plate 52 towards the rear of the loading ring 37, as shown by arrow Z in FIG. 3.

(8-4) Chuck Operation

Figure 15:
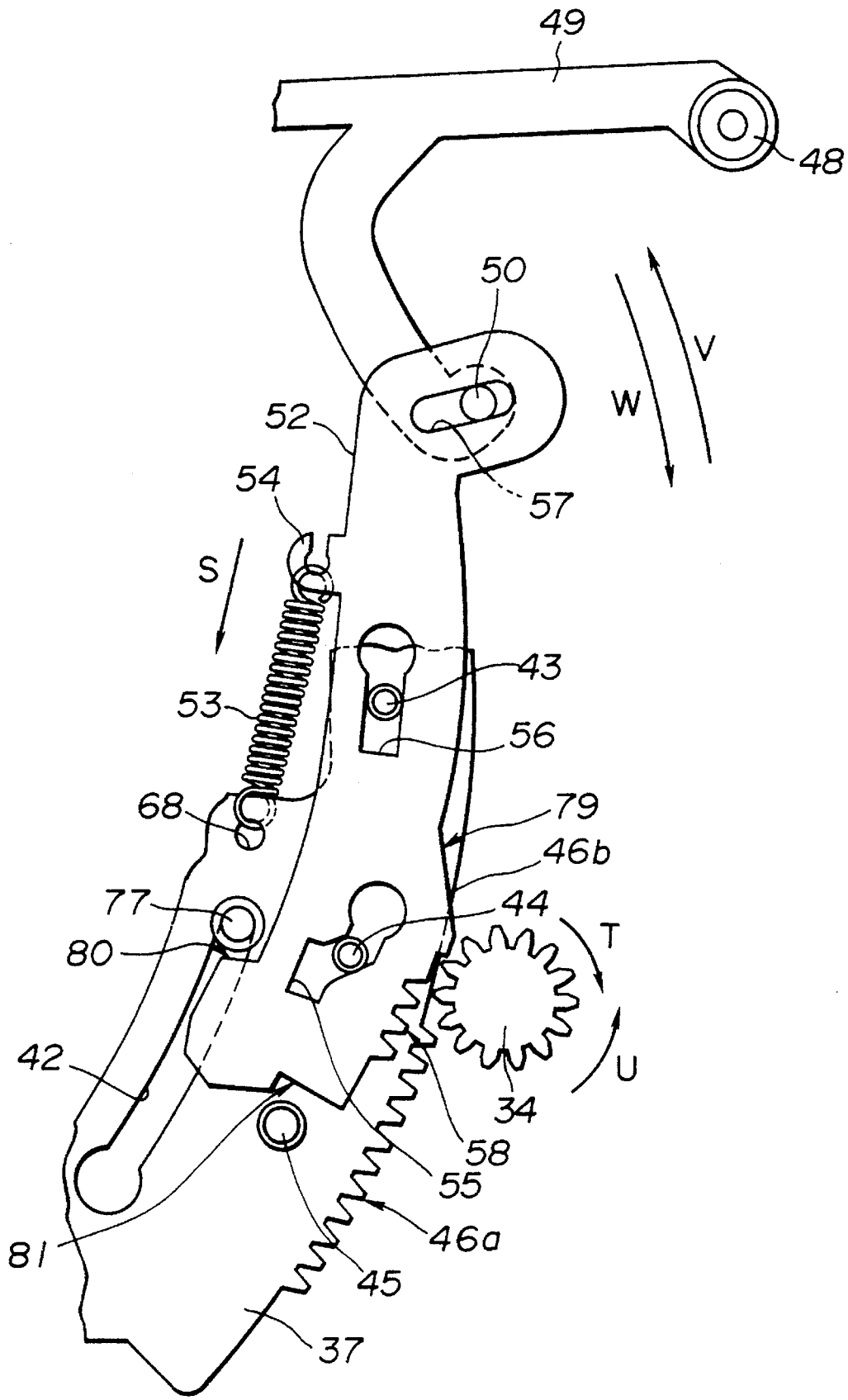
FIG. 15 is an enlarged schematic plan view showing the state in which the disc loading is started and the sub-rack plate has started to be shifted or the state in which disc unloading has substantially been completed and the sub-rack plate has substantially ceased to be shifted.

When the disc detection lever 49 is rotated by the disc 101, the sub-rack plate 52 is moved towards the rear side of the loading ring 37, against the bias of the tension coil spring 53, as shown in FIG. 15. The sub-rack plate 52 has its sub-rack portion 58 projected towards the outer periphery of the loading ring 37 into meshing with the pinion gear 34, as shown in FIGS. 16 and 29 to 31. Since the pinion gear 34 is rotated in a direction of shifting the sub-rack plate 52 rearward, as shown by arrow T in FIGS. 16 and 31, the pinion gear shifts the sub-rack plate 52 rearward as shown by arrow V in FIG. 18.

Figure 19:
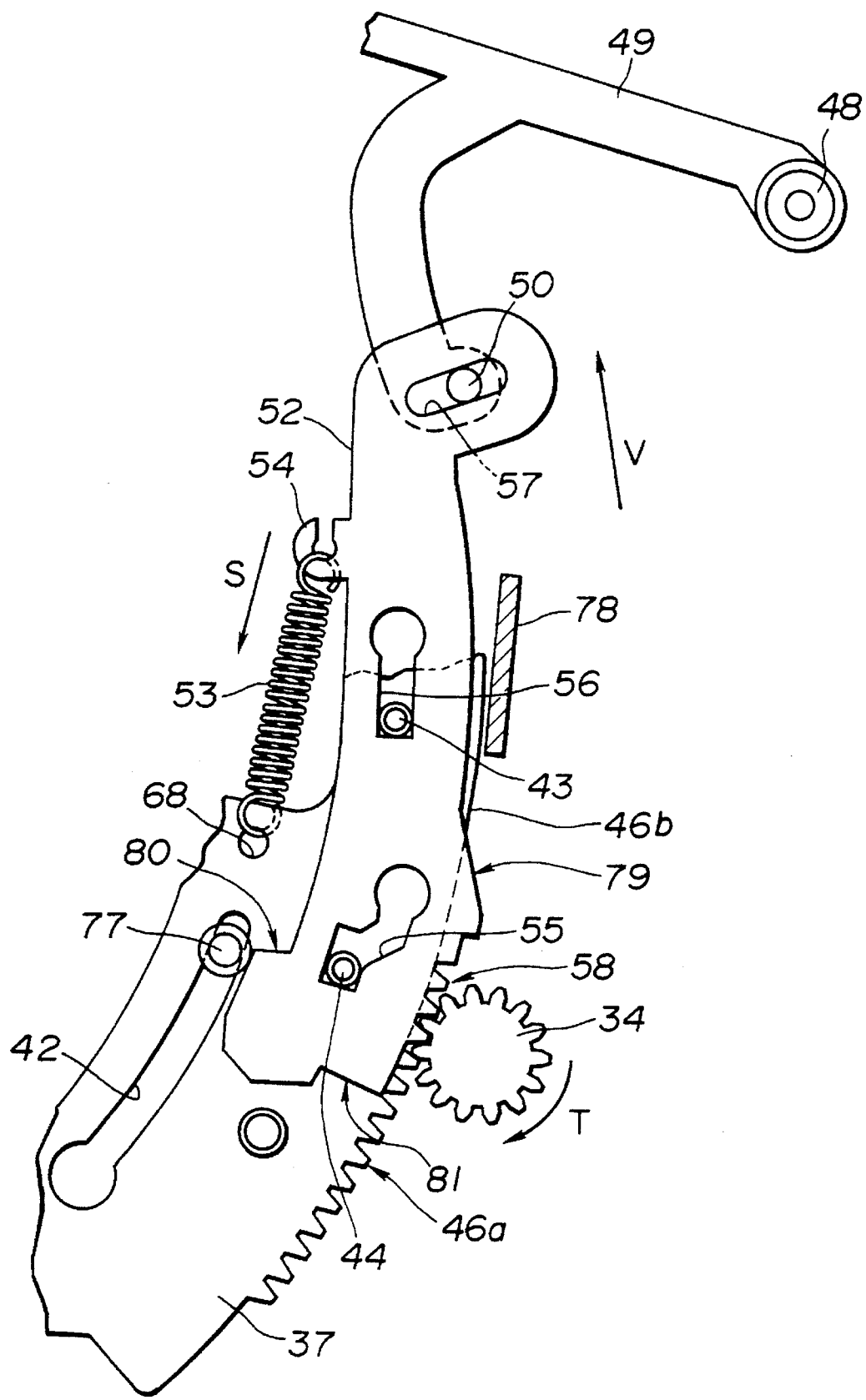
FIG. 19 is an enlarged schematic plan view showing the state in which the loading ring has started to be shifted by the pinion gear during loading.
Figure 20:
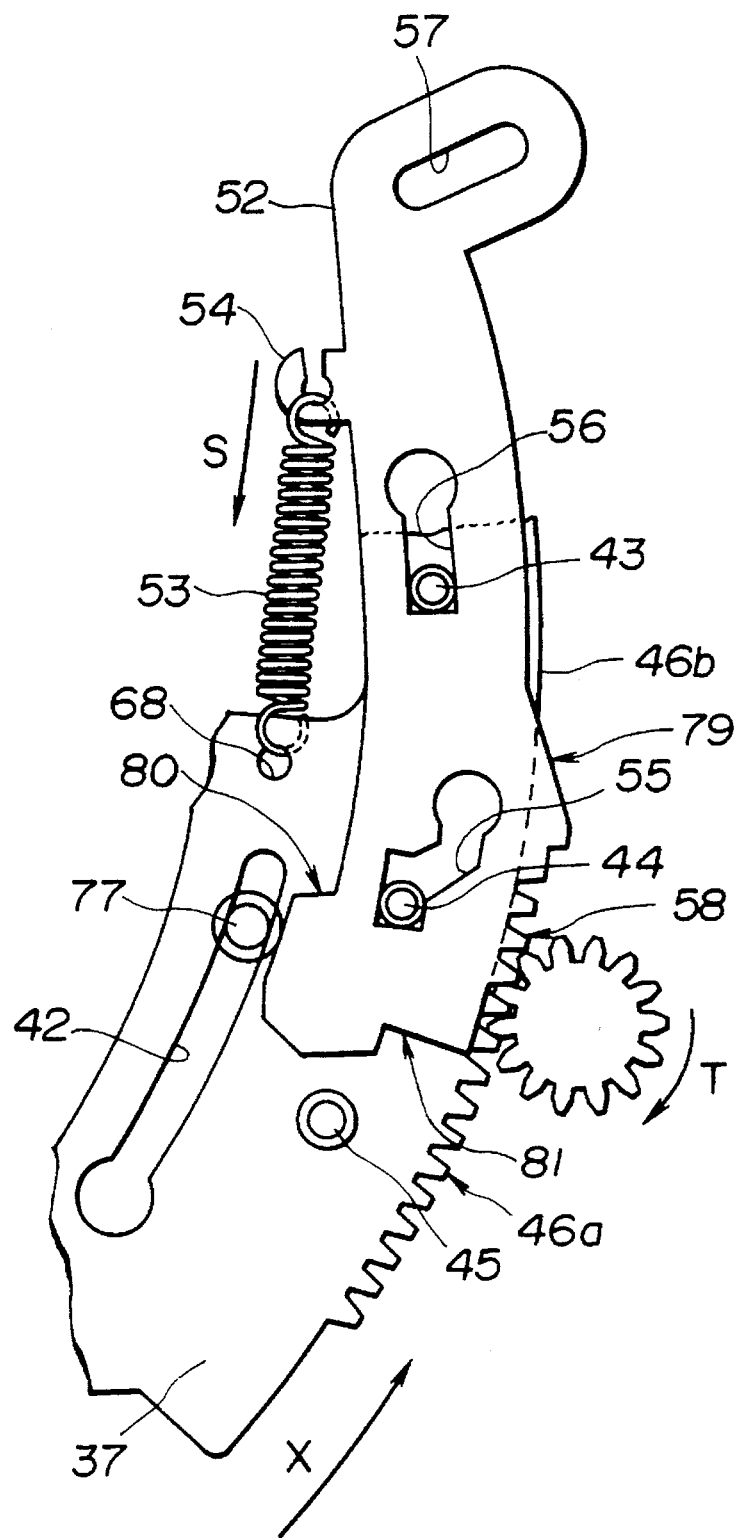
FIG. 20 is an enlarged schematic plan view showing the state in which the pinion gear has started to mesh with a rack part of the loading ring during loading.
Figure 21:
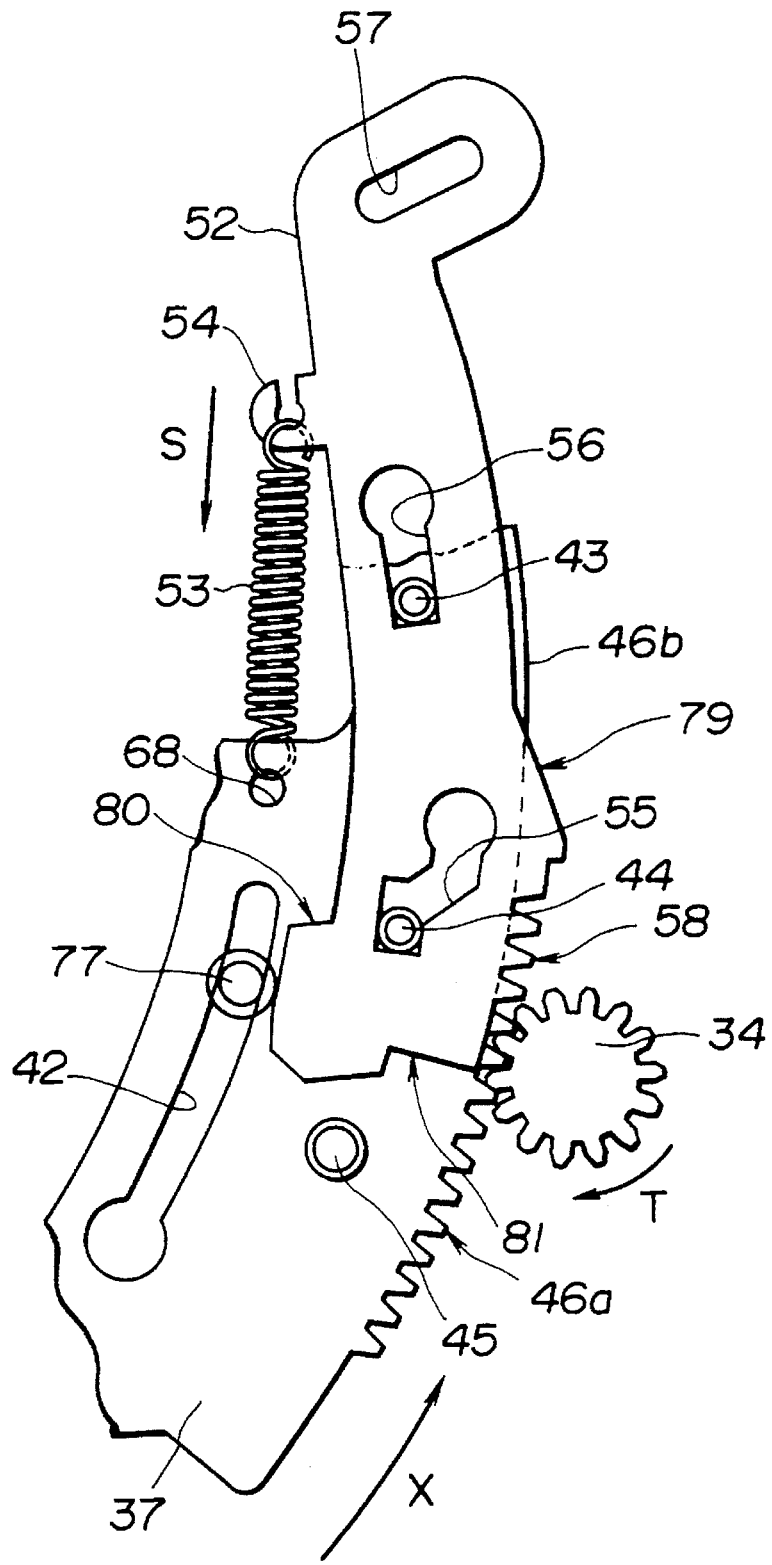
FIG. 21 is an enlarged schematic plan view showing the state in which the pinion gear has meshed with the rack part of the loading ring and started to be shifted during loading.
Figure 31:
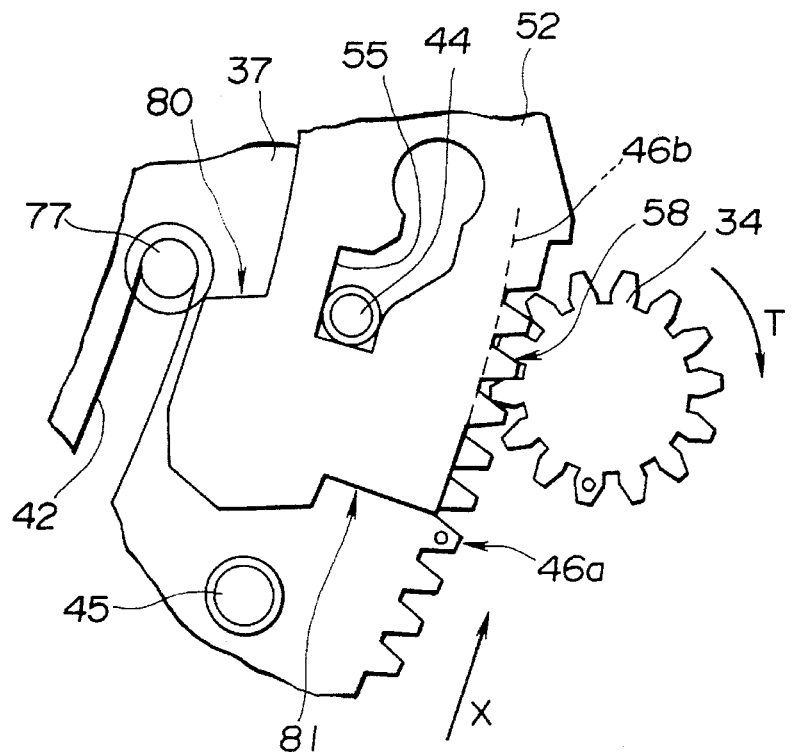
FIG. 31 is an enlarged schematic plan view showing the state in which the pinion gear has meshed with the sub-rack plate during loading.
Figure 32:
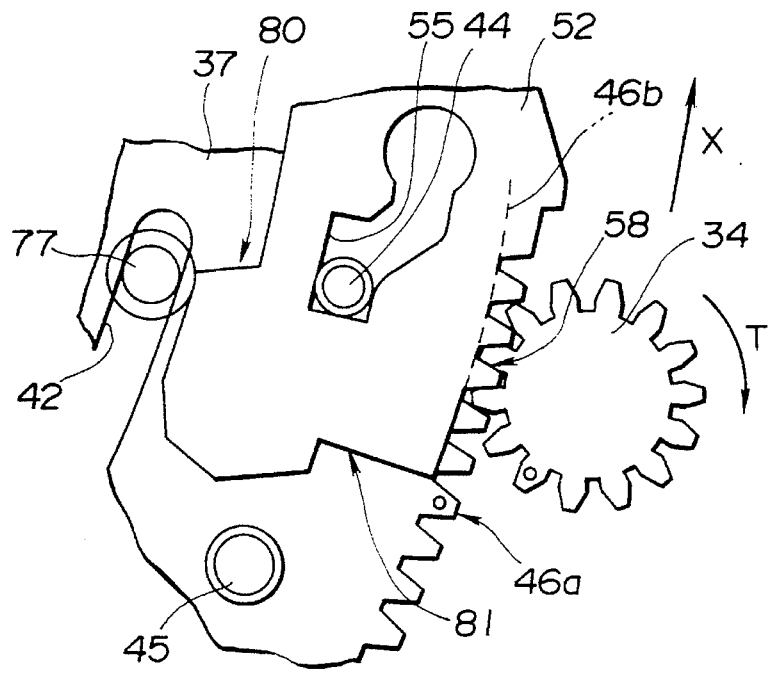
FIG. 32 is an enlarged schematic plan view showing the state in which the loading ring has been moved during loading and the pinion gear has started to mesh with the rack part.
Figure 33:
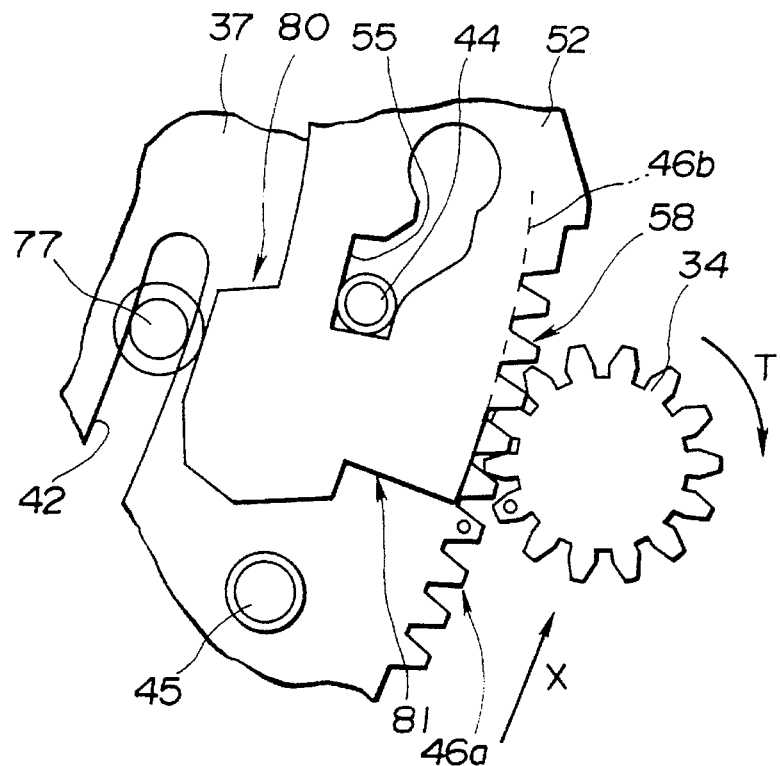
FIG. 33 is an enlarged schematic plan view showing the state in which the pinion gear is shifting the loading ring via the rack part during loading.
Figure 34:
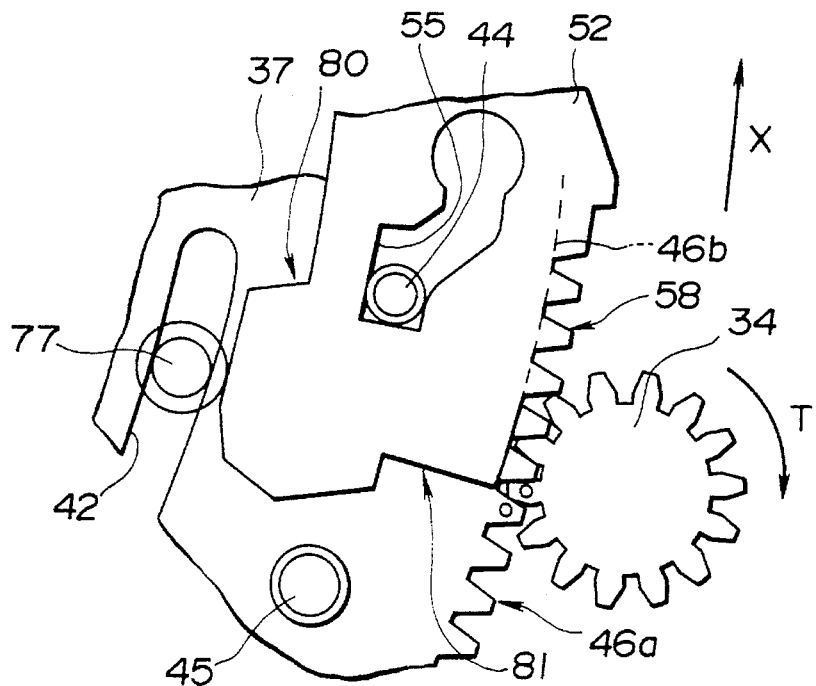
FIG. 34 is an enlarged schematic plan view showing the state in which the loading ring has been shifted during loading to release the meshing of the pinion gear with the sub-rack plate.
Figure 35:
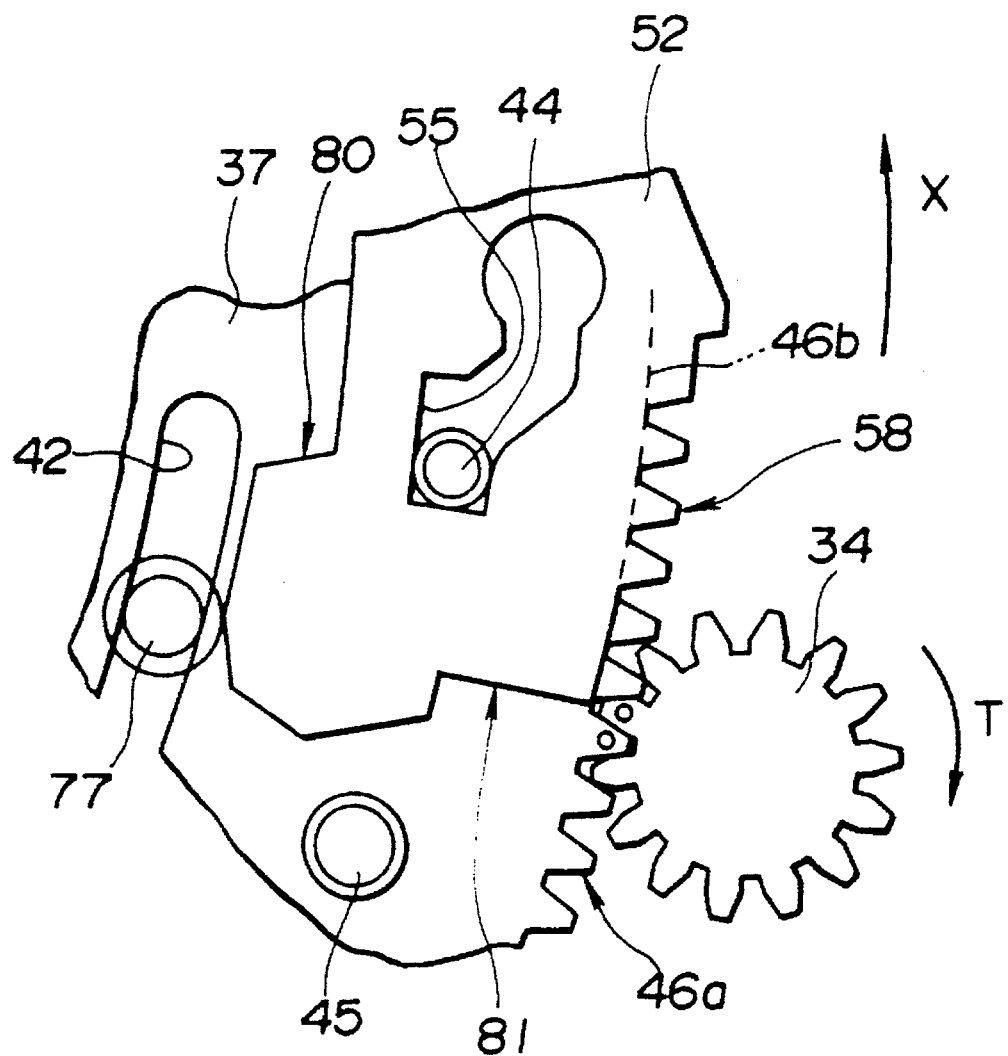
FIG. 35 is an enlarged schematic plan view showing the state in which the pinion gear is further shifting the loading ring via the rack part during loading.

By the sub-rack plate 52 being shifted rearward, the sub-rack plate 58 and the rack portion 46a are in phase with each other, as shown in FIGS. 19 and 31, so that the pinion gear 34 meshes with the main rack portion 46a in direct succession to meshing with the sub-rack portion 58, as shown in FIGS. 32 to 35. Thus the pinion 34 rotates the loading ring 37 in the loading direction indicated by arrow B in FIG. 4 and by arrow X in FIGS. 20 to 22. The sub-rack plate 52 has the shoulder 80 abutted and supported by the guide pin 77 so that the gear part of the sub-rack plate 52 is prevented from being receded towards the center of the loading ring 37.

Figure 22:
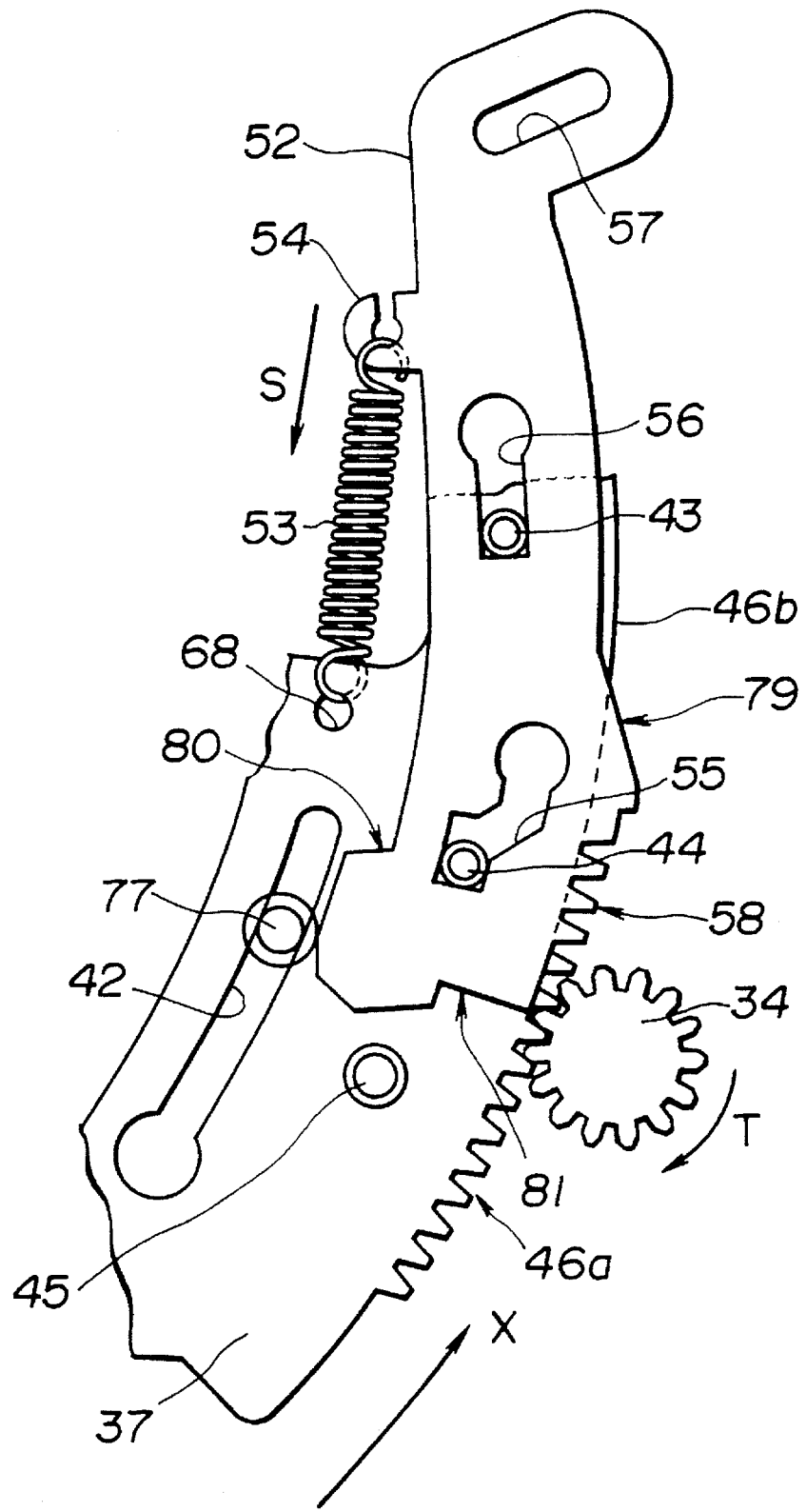
FIG. 22 is an enlarged schematic plan view showing the state in which the pinion gear is shifting the loading ring by the rack part during loading.
Figure 23:
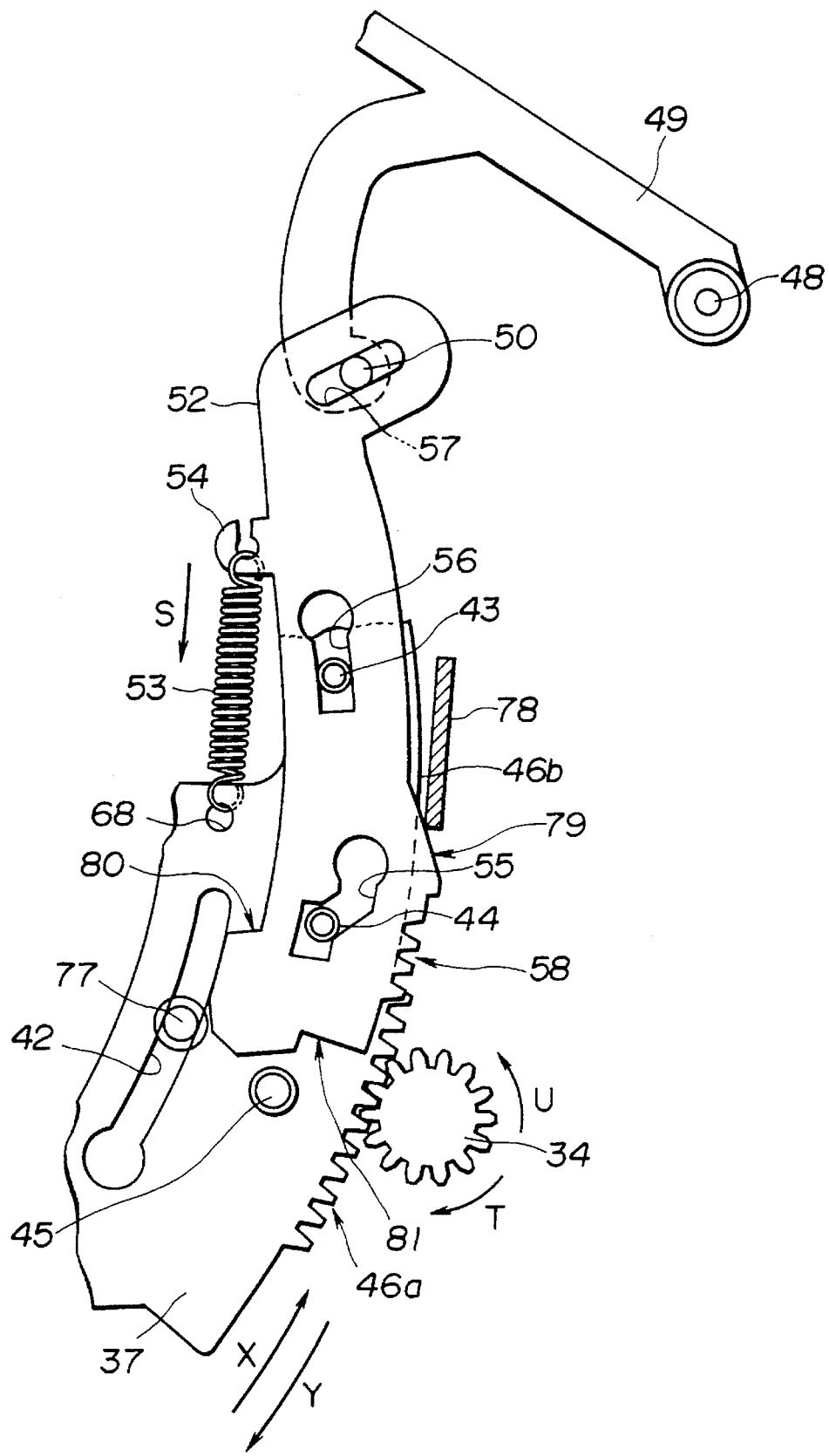
FIG. 23 is an enlarged schematic plan view showing the state in which the pinion gear is shifting the loading ring by the rack part and the sub-rack plate starts to be receded during loading or the state in which the pinion gear is shifting the loading ring by the rack part and the sub-rack plate has substantially ceased to be advanced during unloading.

When the loading ring 37 is further rotated in the loading direction indicated by arrow X in FIG. 22, the sub-rack plate 52 has the sloped portion 79 abutted against the guide lug 78, as shown in FIG. 23, so that the sub-rack plate 52 is restored to the forward position with respect to the loading ring 37. The sloped portion 79 is moved at this time to a position out of abutting contact with the guide pin 77. The loading ring 37 is rotated to the loading end position, as shown in FIG. 4, and is halted at this position since the loading motor 32 is halted. The disc detection lever 49 is rotated to a position in which the disc detection pin 51 is shifted rearward away from the disc 101.

During the time the loading ring 37 is rotated in the loading direction as described above, the disc transport control boss 38 rotates the disc transport roll 22 as shown by arrow D in FIG. 5 and in FIGS. 5 to 7, so that the disc transport roll 22 is moved away from the disc sliding contact plate 18, as shown by arrow E in FIG. 5. By the disc transport roll 22 being displaced away from the disc sliding contact plate 18, the disc transport operation by the disc transport mechanism ceases. After the disc transport roll 22 is spaced apart from the disc sliding contact plate 18, the chuck arm 11 is rotated, as shown in FIG. 10, for clamping the disc 101 between the disc table 6 and the chuck plate 13. After the disc 101 is clamped between the disc table 6 and the chuck plate 13, the lock hook pawl 40 and the lock projection 41 are disengaged from the mating lock member 73 for releasing the holding of the base plate 36 by the chassis 1, as shown in FIGS. 12 and 13.

With the disc loading thus being completed, the disc 101 is rotated by the spindle motor 7 along with the disc table 6 and is readied for recording and/or reproducing information signals by the optical pickup 5.

(5) Unloading

Figure 26:
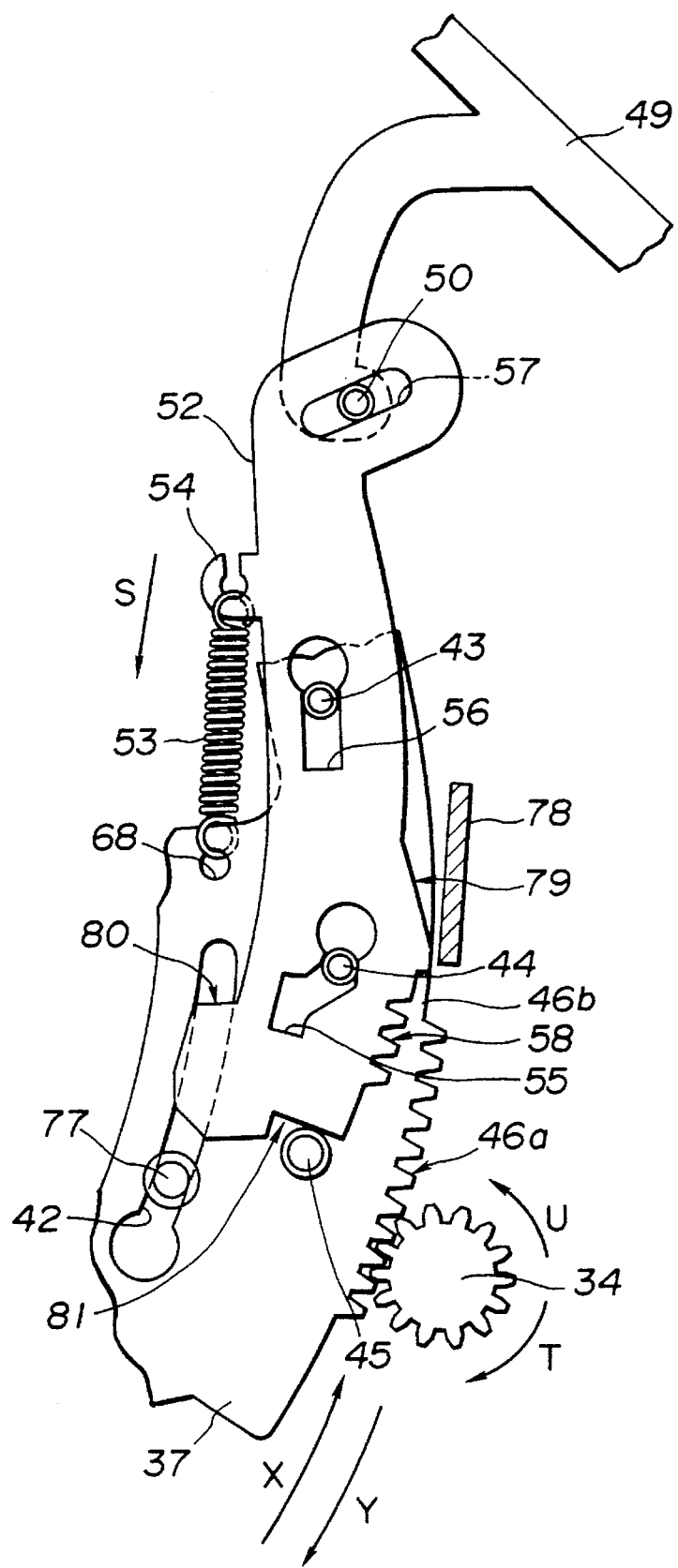
FIG. 26 is an enlarged schematic plan view showing the state in which the shifting of the loading ring by the pinion gear has been completed, that is, the state prior to start of the unloading.
Figure 27:
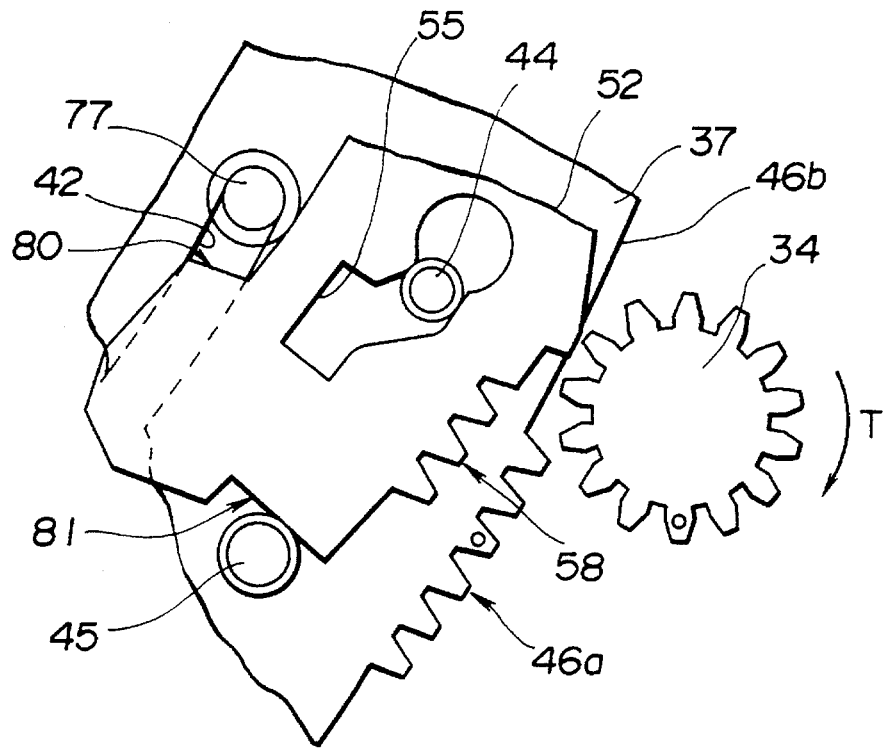
FIG. 27 is an enlarged schematic plan view showing the structure of the sub-rack plate and the loading ring in the initial state.
Figure 28:
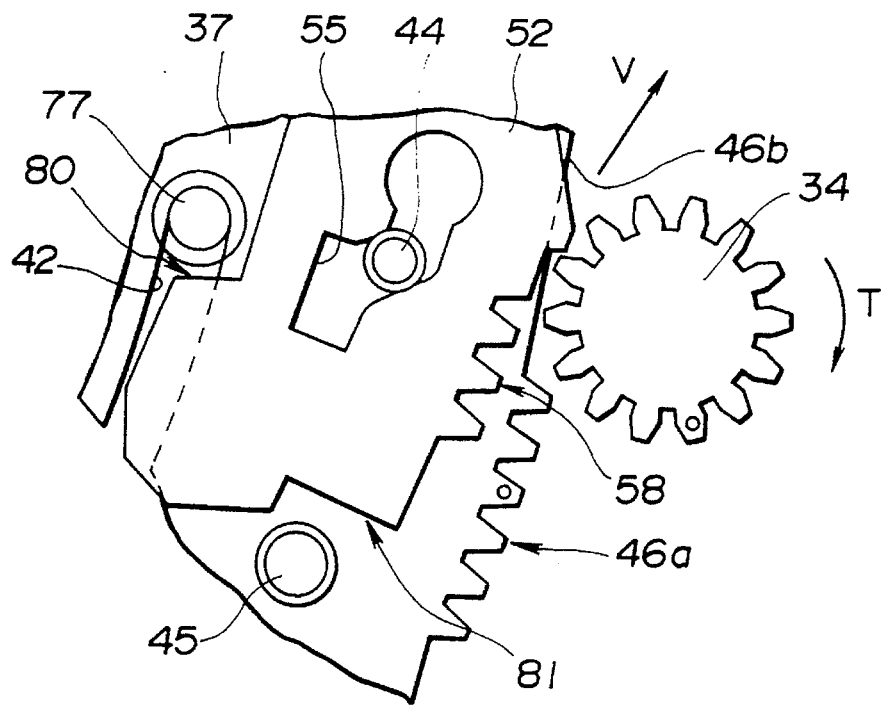
FIG. 28 is an enlarged schematic plan view showing the state in which the shifting of the sub-rack plate has been started during loading.
Figure 29:
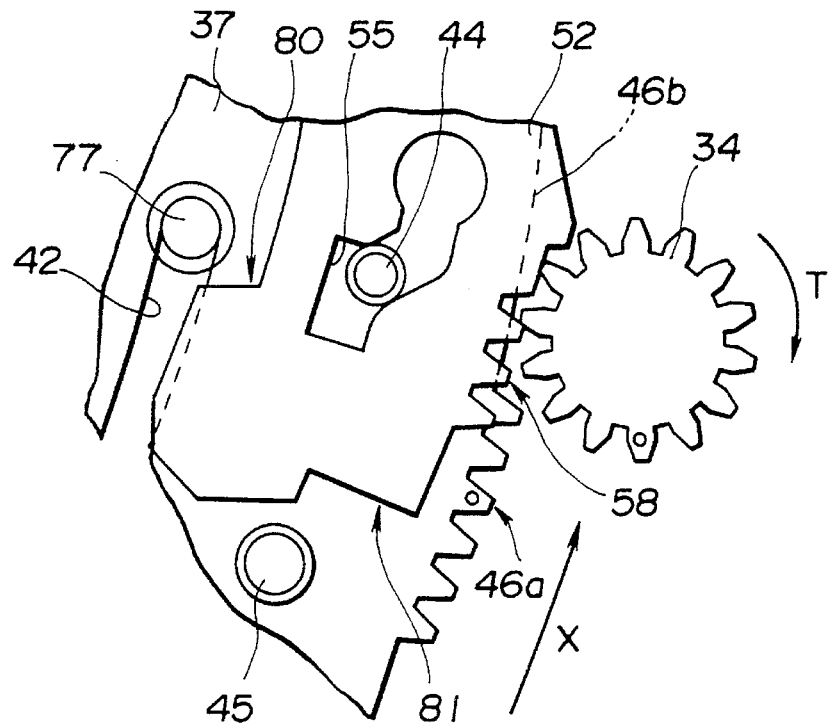
FIG. 29 is an enlarged schematic plan view showing the state in which the meshing of the pinion gear with the sub-rack plate has been started during loading.
Figure 30:
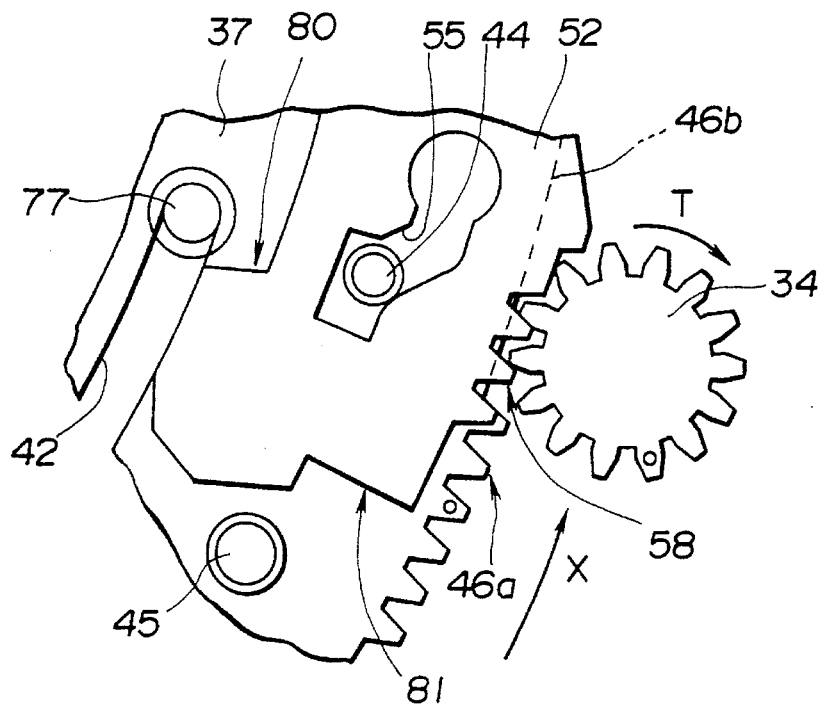
FIG. 30 is an enlarged schematic plan view similar to FIG. 29 showing the state in which the meshing of the pinion gear with the sub-rack plate has been started during loading.

For unloading the disc 101 loaded on the recording/reproducing unit to the outside, the loading motor 32 is driven in rotation in a direction opposite to that for the above-described loading operation. The loading ring 37 then is rotated in the unloading direction or in the direction of being reset to its initial state, as indicated by arrow Y in FIG. 26.

By the loading ring 37 being rotated in the unloading direction, the lock hook pawl 40 and the lock projection 41 are engaged with the mating lock member 73 for holding the chassis 1 in position on the base plate 36, as shown in FIG. 11. After the chassis 1 is held by the lock hook pawl 40 and the lock projection 41, the chuck arm 11 is rotated by the chuck arm operating boss 39, as shown in FIG. 9. The chuck plate 13 is displaced from the disc 101 for releasing the clamping of the disc 101 by the chuck plate 13 and the disc table 6. After the clamping of the disc 101 by the chuck plate 13 and the disc table 6 is released, the disc transport control cam member 20 discontinues the rotation by the disc transport control boss 38 and is reset to the initial state by the tension coil spring 25, as shown in FIGS. 6 and 8.

The cam member 20 cooperates with the disc sliding contact plate 18 for clamping the disc 101 by the disc transport roll 22. Since the disc transport roll 22 is rotated under the driving force of the loading motor 32, the disc transport roll expels the disc 101 out of the outer casing 70. Thus the disc 101 is fed in a direction of arrow $L_2$ in FIG. 3.

Figure 17:
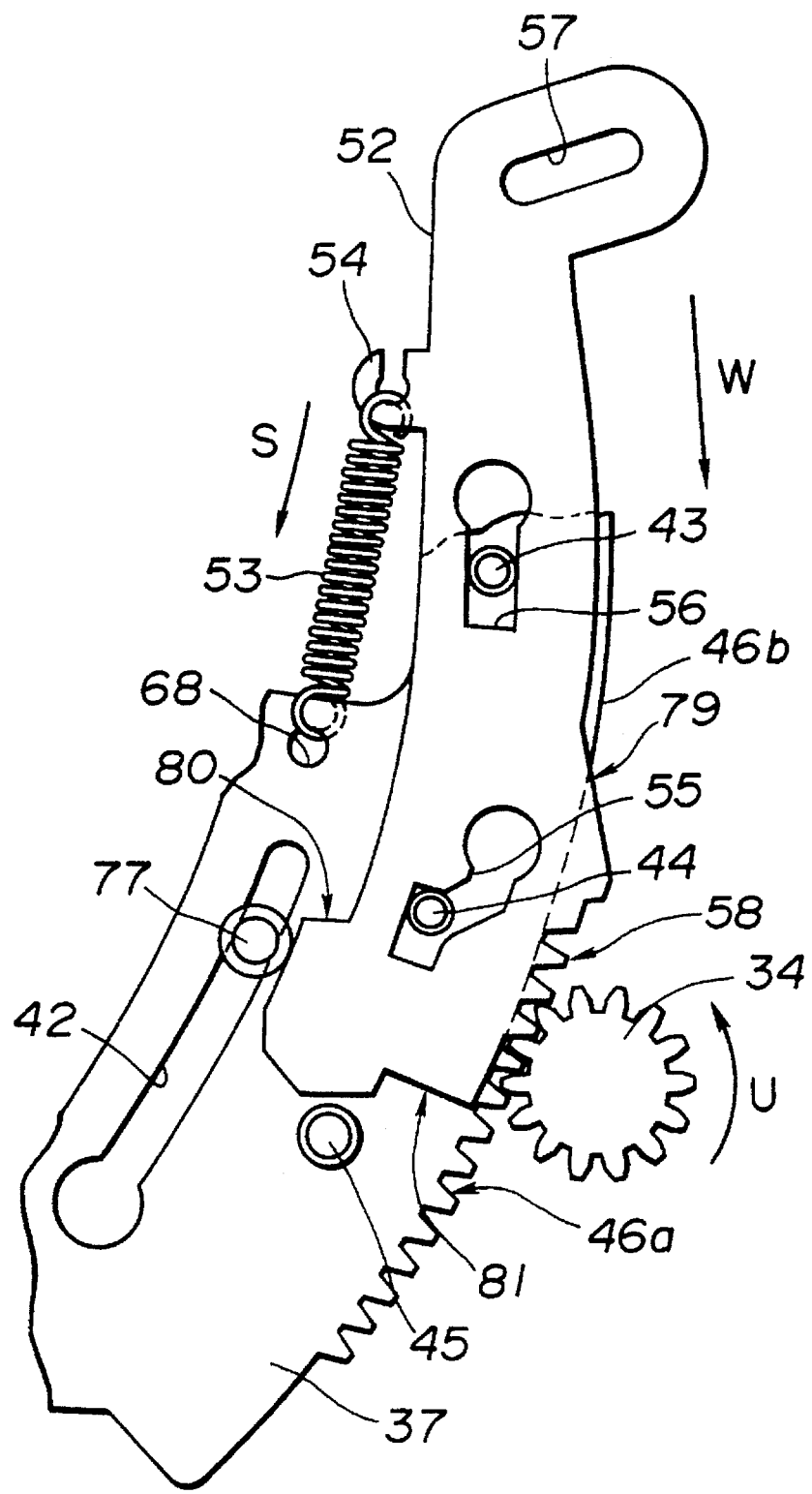
FIG. 17 is an enlarged schematic plan view showing the state in which the sub-rack plate starts to mesh with the pinion gear during unloading.
Figure 24:
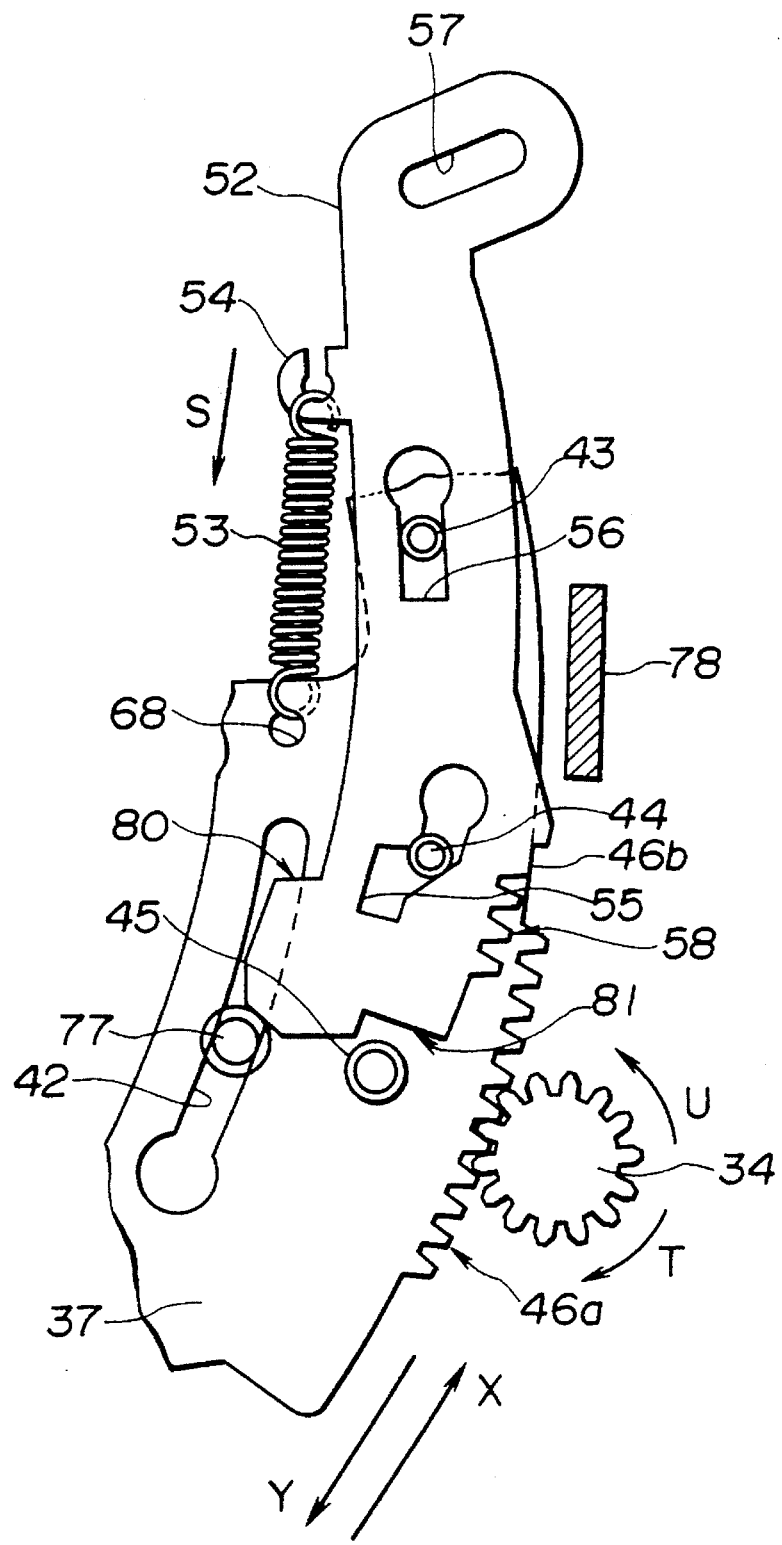
FIG. 24 is an enlarged schematic plan view showing the state in which the pinion gear is shifting the loading ring by the rack part and the sub-rack plate is receded during loading or the state in which the pinion gear is shifting the loading ring by the rack part and the sub-rack plate has been advanced during unloading.
Figure 25:
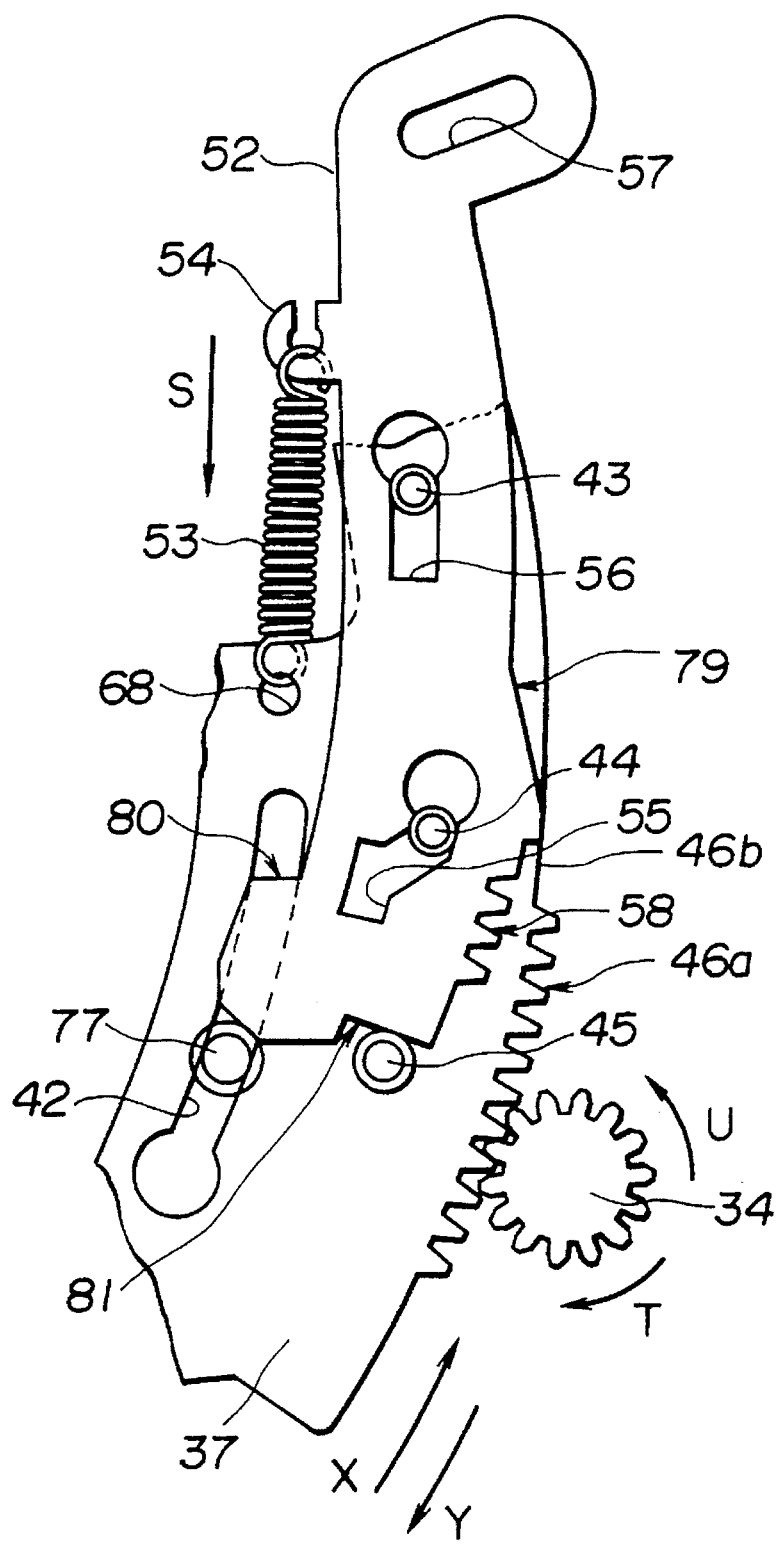
FIG. 25 is an enlarged schematic plan view showing the state in which the pinion gear is shifting the loading ring by the rack part and the sub-rack plate has been receded during loading or the state in which the pinion gear is shifting the loading ring by the rack part and the sub-rack plate has not been advanced during unloading.

When the loading ring 37 is rotated in the unloading direction, as shown in FIGS. 25 and 24, the sub-rack plate 52 causes the sub-rack portion 58 to be advanced towards the outer periphery of the rotating loading ring 37, by the shoulder 80 being abutted against the guide pin 77 as shown in FIGS. 23 and 17. Since the sub-rack portion 58 is in-phase with the main rack portion 46a, the pinion gear 34 is engaged with the sub-rack portion 58 in continuation to the main rack portion 46a for rotating the loading ring 37 in the unloading direction.

Figure 16:
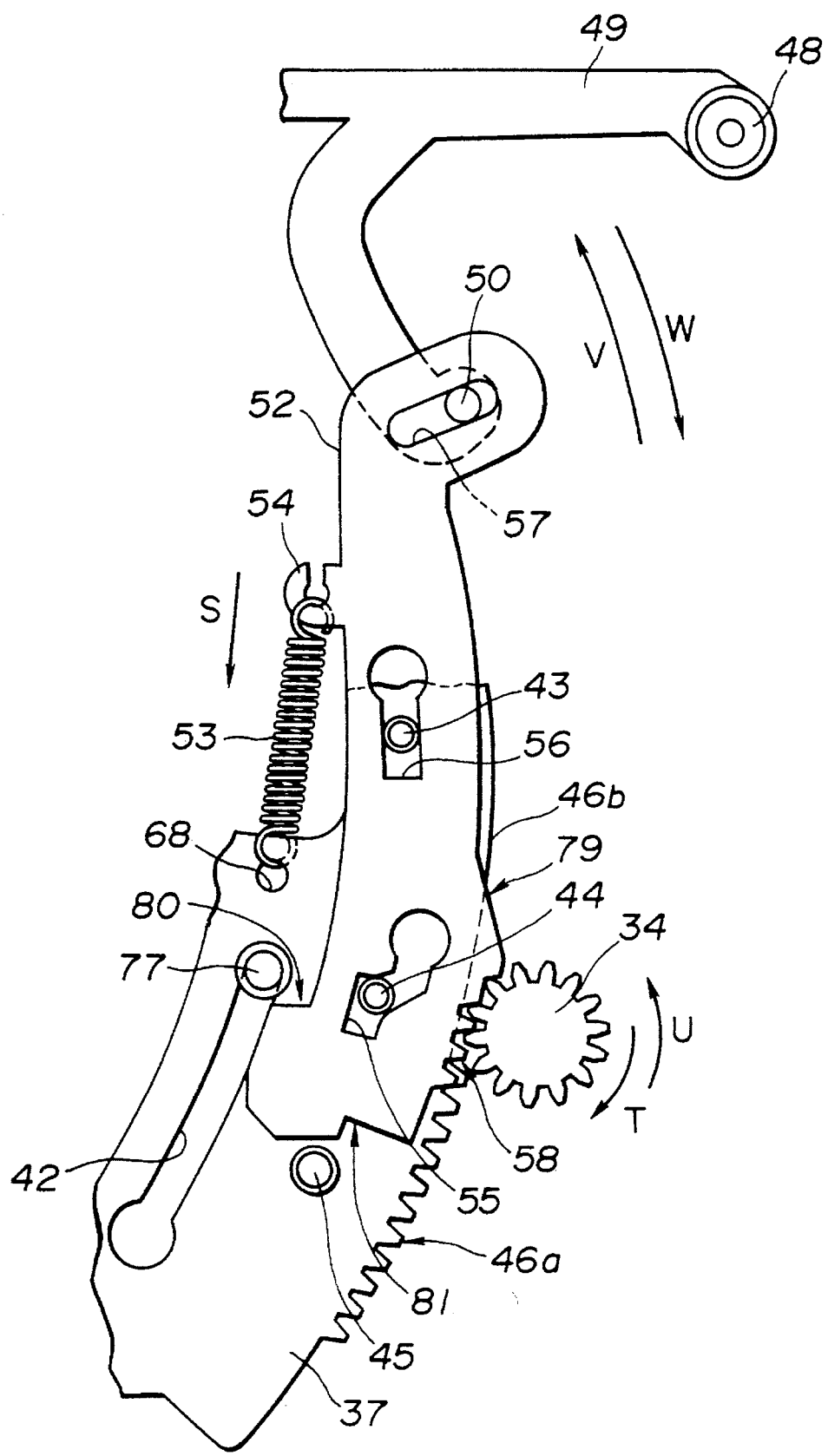
FIG. 16 is an enlarged schematic plan view showing the state in which the sub-rack plate starts to mesh with a pinion gear during loading or the state in which the meshing starts to be released during unloading.

When the loading ring 37 is reset to the initial state, as shown in FIG. 16, the sub-rack plate 52 is at a position in which the shoulder 80 is not abutted against the guide pin 77, as shown in FIG. 16. The sub-rack plate 52 is moved by the tension coil spring 53 to the initial position as shown by arrow W in FIG. 15, until it is halted at the initial position with the forward end 81 being abutted against the abutment pin 45, as shown in FIG. 14.

What is claimed is:

1. A loading device for a disc-shaped recording medium, comprising:
   a recording/reproducing unit for recording and reproducing information signals on and from the disc-shaped recording medium;
   a base plate:
   a ring-shaped loading member mounted on the base plate beneath said recording reproducing unit and facing the disc-shaped recording medium for performing a rotary shifting movement along a surface of the base plate during loading unloading of the disc-shaped recording medium;
   a transport mechanism for transporting the disc-shaped recording medium to said recording/reproducing unit and for rotating said ring-shaped loading member;
   a control mechanism for terminating the disc transport operation by said transport mechanism upon said ring-shaped loading member being rotated a predetermined amount by said transport mechanism;
   a loading mechanism for loading the disc-shaped recording medium onto said recording/reproducing unit after termination by said control mechanism of the transporting operation of the disc-shaped recording medium by said transport mechanism;
   a chassis arranged on said base plate and having said recording/reproducing unit mounted thereon; and
   a holding mechanism for holding said chassis having said recording/reproducing unit mounted thereon in a locked position on said base plate when said loading member is at an initial position, said holding mechanism holding said chassis with respect to said base plate by the rotary movement of said ring-shaped loading member, said holding mechanism releasing the holding of said chassis with respect to said base plate by the rotary movement of said ring-shaped loading member after the disc-shaped recording medium is loaded on said recording/reproducing unit by said loading mechanism.

2. A loading device for a disc-shaped recording medium, comprising
   a recording/reproducing unit for recording and reproducing information signals on and from the disc-shaped recording medium;
   a base plate:
   a ring-shaped loading member mounted on the base plate beneath said recording reproducing unit and facing the disc-shaped recording medium for performing a rotary shifting movement along a surface of the base plate during loading unloading of the disc-shaped recording medium;
   a transport mechanism for transporting the disc-shaped recording medium to said recording/reproducing unit and for rotating said ring-shaped loading member;
   a control mechanism for terminating the disc transport operation by said transport mechanism upon said ring-shaped loading member being rotated a predetermined amount by said transport mechanism;
   a loading mechanism for loading the disc-shaped recording medium onto said recording/reproducing unit after termination by said control mechanism of the transporting operation of the disc-shaped recording medium by said transport mechanism;
   a chassis arranged on said base plate and having said recording/reproducing unit mounted thereon; and
   a buffer mechanism arranged between said chassis and said base plate.

3. The loading device for the disc-shaped recording medium as claimed in claim 2,
   wherein said buffer mechanism comprises a plurality of elastically deformable members each having one end mounted on said chassis and another end mounted on said base plate and further comprising
   a holding mechanism having an engagement boss formed on one of said loading member and said chassis and an engagement recess formed in the other of said loading member and said chassis, the engagement boss engaging the engagement recess for inhibiting deformation of said plurality of elastically deformable members.

4. A loading device for a disc-shaped recording medium, comprising:
   a recording/reproducing unit for recording and reproducing information signals on and from the disc-shaped recording medium;
   a base plate:
   a ring-shaped loading member mounted on the base plate beneath said recording reproducing unit and facing the disc-shaped recording medium for performing a rotary shifting movement along a surface of the base plate during loading unloading of the disc-shaped recording medium;
   a transport mechanism for transporting the disc-shaped recording medium to said recording/reproducing unit and for rotating said ring-shaped loading member;
   a control mechanism for terminating the disc transport operation by said transport mechanism upon said ring-shaped loading member being rotated a predetermined amount by said transport mechanism;
   a loading mechanism for loading the disc-shaped recording medium onto said recording/reproducing unit after termination by said control mechanism of the transporting operation of the disc-shaped recording medium by said transport mechanism;
   an actuating member connected to said loading member and being actuated by the disc-shaped recording medium inserted therein; and
   a drive power transmission mechanism for transmitting driving power to said transport mechanism, said loading member having a main gear portion meshing with said drive power transmission mechanism and an interrupted gear portion contiguous to said main gear portion, said transport mechanism being driven for transporting the disc-shaped recording medium when the interrupted gear portion faces said drive power transmission mechanism, and said actuating member shifts said loading member so that the main gear portion of said loading member meshes with said drive power transmission mechanism when said actuating member is actuated by the transported disc-shaped recording medium.

5. A loading device for a disc-shaped recording medium, comprising:
   a recording/reproducing unit for recording and reproducing information signals on and from the disc-shaped recording medium;
   a base plate:

a ring-shaped loading member mounted on the base plate beneath said recording reproducing unit and facing the disc-shaped recording medium for performing a rotary shifting movement along a surface of the base plate during loading unloading of the disc-shaped recording medium;

a transport mechanism for transporting the disc-shaped recording medium to said recording/reproducing unit and for rotating said ring-shaped loading member;

a control mechanism for terminating the disc transport operation by said transport mechanism upon said ring-shaped loading member being rotated a predetermined amount by said transport mechanism;

a loading mechanism for loading the disc-shaped recording medium onto said recording/reproducing unit after termination by said control mechanism of the transporting operation of the disc-shaped recording medium by said transport mechanism;

a detection lever for movement by the disc-shaped recording medium introduced into said recording/reproducing unit;

a shifting member arranged for shifting said ring-shaped loading member upon said shifting member being shifted by movement of said detection lever; and a drive mechanism meshing with said shifting member when said shifting member is shifted by said detection lever, and said drive mechanism meshing with said loading member when said loading member is shifted by said shifting member.

6. A loading device for a disc-shaped recording medium having a first and a second surface, comprising:

a chassis;

a recording/reproducing unit for recording and reproducing information signals on and from the disc-shaped recording medium and being mounted on said chassis;

a base plate;

a transport mechanism mounted on said base plate for transporting the disc-shaped recording medium introduced therein to said recording/reproducing unit, said transport mechanism having a driving roll arranged to contact the first surface of the disc-shaped recording medium for transporting the disc-shaped recording medium towards said recording/reproducing unit and a clamp member arranged to contact the second surface of the disc-shaped recording medium for selectively clamping the disc-shaped recording medium in cooperation with the driving roll;

a loading mechanism mounted on said chassis for loading the disc-shaped recording medium transported by said transport mechanism onto said recording/reproducing unit;

a plurality of elastically deformable elastic members each having a first end and a second end, each first end mounted on said chassis and each second end mounted on said base plate;

a holding mechanism inhibiting elastic deformation of said elastic members for holding said chassis in position on said base plate until the disc-shaped recording medium is transported by said transport mechanism to said recording/reproducing unit and loaded by said loading mechanism;

a loading member mounted for movement on said base plate and facing said recording/reproducing unit for performing a rotating movement along a surface of said base plate, said loading member having an interrupted gear portion and a main gear portion;

an actuating mechanism for rotating said loading member in response to the disc-shaped recording medium being transported; and a driving mechanism for transmitting a driving force to said loading mechanism and said transport mechanism, said driving mechanism transmitting a driving force to said transport mechanism when the interrupted gear portion of said loading member faces said driving mechanism, said driving mechanism meshing with said main gear portion for driving said loading member when said loading member is rotated by said actuating mechanism.

7. The loading device for the disc-shaped recording medium as claimed in claim 6, wherein said actuating mechanism is actuated by the disc-shaped recording medium transported by said transport mechanism and shifts said loading member to engage said main gear portion with said driving mechanism.

8. The loading device for the disc-shaped recording medium as claimed in claim 6, wherein said holding mechanism comprises an engaging boss formed on one of said loading member and said chassis having said recording/reproducing unit mounted thereon and an engaging recess formed in the other of said loading member and said chassis, the engaging boss being engaged with the engagement recess for inhibiting elastic deformation of said elastic members.

9. The loading device for the disc-shaped recording medium as claimed in claim 6, wherein said loading member has control means for selecting between a first state in which the disc-shaped recording medium is contacted only by the clamp member of the transport mechanism and the driving roll of the transport mechanism is released from clamping the disc-shaped recording medium and a second state in which the disc-shaped recording medium is clamped by both the driving roll and the clamp member for ejecting the disc-shaped recording medium.

10. The loading device for the disc-shaped recording medium as claimed in claim 6, wherein said loading member has driving operating means for selecting between a loaded state of the loading mechanism on the chassis or an unloaded state in which the loading state is released.

* * * * *